(12) United States Patent
Nakano et al.

(10) Patent No.: US 10,004,293 B2
(45) Date of Patent: Jun. 26, 2018

(54) CROSSLINKED PRODUCT, METHOD FOR PRODUCING THE SAME AND THE USE THEREOF, AND ETHYLENE COPOLYMER

(71) Applicant: MITSUI CHEMICALS, INC., Tokyo (JP)

(72) Inventors: Hidetake Nakano, Ichihara (JP); Kiminori Noda, Mobara (JP); Kazuaki Yasuda, Hiroshima (JP)

(73) Assignee: MITSUI CHEMICALS, INC., Tokyo (JP)

( * ) Notice: Subject to any disclaimer, the term of this patent is extended or adjusted under 35 U.S.C. 154(b) by 1 day.

(21) Appl. No.: 15/109,926

(22) PCT Filed: Feb. 4, 2015

(86) PCT No.: PCT/JP2015/053094
§ 371 (c)(1),
(2) Date: Jul. 6, 2016

(87) PCT Pub. No.: WO2015/129414
PCT Pub. Date: Sep. 3, 2015

(65) Prior Publication Data
US 2016/0331073 A1 Nov. 17, 2016

(30) Foreign Application Priority Data

Feb. 28, 2014 (JP) ................. 2014-039349

(51) Int. Cl.

| | | |
|---|---|---|
| C08G 63/02 | (2006.01) |
| A43B 13/12 | (2006.01) |
| C08J 3/24 | (2006.01) |
| C08J 9/00 | (2006.01) |
| C08J 9/10 | (2006.01) |
| B32B 9/02 | (2006.01) |
| B32B 9/04 | (2006.01) |
| B32B 25/08 | (2006.01) |
| B32B 27/08 | (2006.01) |
| B32B 27/32 | (2006.01) |
| B32B 27/40 | (2006.01) |
| A43B 13/04 | (2006.01) |
| B29D 35/14 | (2010.01) |
| C08F 210/16 | (2006.01) |

(52) U.S. Cl.
CPC .............. *A43B 13/12* (2013.01); *A43B 13/04* (2013.01); *B29D 35/142* (2013.01); *B32B 9/025* (2013.01); *B32B 9/045* (2013.01); *B32B 25/08* (2013.01); *B32B 27/08* (2013.01); *B32B 27/32* (2013.01); *B32B 27/40* (2013.01); *C08F 210/16* (2013.01); *C08J 3/24* (2013.01); *C08J 9/0061* (2013.01); *C08J 9/103* (2013.01); *B32B 2307/72* (2013.01); *B32B 2437/02* (2013.01); *B32B 2605/003* (2013.01); *C08J 2201/026* (2013.01); *C08J 2201/03* (2013.01); *C08J 2203/04* (2013.01); *C08J 2207/00* (2013.01); *C08J 2323/08* (2013.01); *C08J 2323/26* (2013.01); *C08J 2331/04* (2013.01); *C08J 2423/08* (2013.01); *C08J 2431/04* (2013.01)

(58) Field of Classification Search
CPC ....................................................... A43B 13/12
USPC ........................................................ 428/423
See application file for complete search history.

(56) References Cited

U.S. PATENT DOCUMENTS

| | | | |
|---|---|---|---|
| 4,892,851 A | 1/1990 | Ewen et al. |
| 4,960,878 A | 10/1990 | Crapo et al. |
| 5,026,798 A | 6/1991 | Canich |
| 5,041,584 A | 8/1991 | Crapo et al. |
| 5,055,438 A | 10/1991 | Canich |
| 5,057,475 A | 10/1991 | Canich et al. |

(Continued)

FOREIGN PATENT DOCUMENTS

| | | |
|---|---|---|
| CN | 101180356 A | 5/2008 |
| CN | 101547946 A | 9/2009 |

(Continued)

OTHER PUBLICATIONS

Kaji et al., "Development of New Modified Methylaluminoxanes," TOSOH Research & Technology Review, vol. 47, pp. 55-60 (2003).

(Continued)

*Primary Examiner* — Terressa Boykin
(74) *Attorney, Agent, or Firm* — Foley & Lardner LLP

(57) ABSTRACT

The present method for producing a crosslinked product include the steps of: melt molding an ethylene copolymer (A) or a resin composition containing the ethylene copolymer (A); and carrying out crosslinking; wherein the ethylene copolymer (A) contains a constitutional unit derived from ethylene and a constitutional unit derived from an α-olefin having 3 to 20 carbon atoms, and satisfies the following requirements (1), (2) and (3): (1) a vinyl group content per 1,000 carbon atoms as measured by $^1$H-NMR is from 0.06 to 1; (2) a ratio $MFR_{10}/MFR_{2.16}$ is from 8.5 to 50; and (3) a density d is from 850 kg/m$^3$ to 920 kg/m$^3$. The present method for producing a crosslinked product is capable of providing a crosslinked product having a good moldability and an excellent mechanical strength. Further, the present method is capable of providing a foamed product which is light weight and excellent in mechanical strength, with an excellent productivity; as well as providing crosslinked molded articles whose dimensional variations between individual products are small.

13 Claims, No Drawings

(56) References Cited

U.S. PATENT DOCUMENTS

| | | |
|---|---|---|
| 5,096,867 A | 3/1992 | Canich |
| 5,153,157 A | 10/1992 | Hlatky et al. |
| 5,155,080 A | 10/1992 | Elder et al. |
| 5,158,920 A | 10/1992 | Razavi |
| 5,162,278 A | 11/1992 | Razavi |
| 5,166,250 A | 11/1992 | Breant |
| 5,198,401 A | 3/1993 | Turner et al. |
| 5,218,071 A | 6/1993 | Tsutsui et al. |
| 5,223,467 A | 6/1993 | Razavi |
| 5,223,468 A | 6/1993 | Razavi |
| 5,225,500 A | 7/1993 | Elder et al. |
| 5,227,440 A | 7/1993 | Canich et al. |
| 5,241,025 A | 8/1993 | Hlatky et al. |
| 5,243,002 A | 9/1993 | Razavi |
| 5,264,405 A | 11/1993 | Canich |
| 5,278,119 A | 1/1994 | Turner et al. |
| 5,278,265 A | 1/1994 | Razavi |
| 5,292,838 A | 3/1994 | Razavi |
| 5,304,523 A | 4/1994 | Razavi |
| 5,321,106 A | 6/1994 | Lapointe |
| 5,334,677 A | 8/1994 | Razavi et al. |
| 5,336,746 A | 8/1994 | Tsutsui et al. |
| 5,384,299 A | 1/1995 | Turner et al. |
| 5,387,568 A | 2/1995 | Ewen et al. |
| 5,391,629 A | 2/1995 | Turner et al. |
| 5,407,884 A | 4/1995 | Turner et al. |
| 5,408,017 A | 4/1995 | Turner et al. |
| 5,420,217 A | 5/1995 | Canich |
| 5,470,927 A | 11/1995 | Turner et al. |
| 5,483,014 A | 1/1996 | Turner et al. |
| 5,504,169 A | 4/1996 | Canich |
| 5,519,100 A | 5/1996 | Ewen et al. |
| 5,525,689 A | 6/1996 | Tsutsui et al. |
| 5,547,675 A | 8/1996 | Canich |
| 5,561,092 A | 10/1996 | Ewen et al. |
| 5,589,556 A | 12/1996 | Razavi et al. |
| 5,599,761 A | 2/1997 | Turner |
| 5,614,457 A | 3/1997 | Ewen et al. |
| 5,621,126 A | 4/1997 | Canich et al. |
| 5,631,391 A | 5/1997 | Canich |
| 5,639,842 A | 6/1997 | Tsutsui et al. |
| 5,663,249 A | 9/1997 | Ewen et al. |
| 5,714,426 A | 2/1998 | Tsutsui et al. |
| 5,723,560 A | 3/1998 | Canich |
| 5,763,549 A | 6/1998 | Elder et al. |
| 5,801,113 A | 9/1998 | Jejelowo et al. |
| 5,807,939 A | 9/1998 | Elder et al. |
| 5,883,202 A | 3/1999 | Ewen et al. |
| 5,916,988 A | 6/1999 | Tsutsui et al. |
| 6,121,395 A | 9/2000 | Turner |
| 6,232,420 B1 | 5/2001 | Turner |
| 6,245,706 B1 | 6/2001 | Hlatky |
| 6,265,338 B1 | 7/2001 | Canich |
| 6,294,625 B1 | 9/2001 | Hlatky et al. |
| 6,355,592 B1 | 3/2002 | Hlatky et al. |
| 6,417,120 B1 | 7/2002 | Mitchler et al. |
| 6,423,795 B1 | 7/2002 | Canich et al. |
| 6,617,466 B1 | 9/2003 | Canich |
| 6,632,898 B1 | 10/2003 | Canich |
| 7,041,841 B1 | 5/2006 | Canich |
| 7,163,907 B1 | 1/2007 | Canich et al. |
| 7,569,646 B1 | 8/2009 | Canich |
| 8,329,848 B2 * | 12/2012 | Kajihara ............ B29D 35/122 525/232 |
| 8,772,365 B2 | 7/2014 | Kajihara et al. |
| 2002/0143077 A1 | 10/2002 | Sueda et al. |
| 2002/0155776 A1 | 10/2002 | Mitchler et al. |
| 2006/0178491 A1 | 8/2006 | Canich |
| 2009/0018299 A1 | 1/2009 | Tasaki et al. |
| 2009/0100704 A1 | 4/2009 | Kajihara et al. |
| 2009/0249645 A1 | 10/2009 | Kajihara et al. |
| 2014/0357799 A1 | 12/2014 | Wu et al. |

FOREIGN PATENT DOCUMENTS

| | | |
|---|---|---|
| CN | 103497413 A | 1/2014 |
| EP | 2 077 283 | 7/2009 |
| JP | H01-501950 A | 7/1989 |
| JP | H01-502036 A | 7/1989 |
| JP | H03-179005 A | 8/1991 |
| JP | H03-179006 A | 8/1991 |
| JP | H03-207703 A | 9/1991 |
| JP | H03-207704 A | 9/1991 |
| JP | H06-087990 A | 3/1994 |
| JP | 2004-051676 A | 2/2004 |
| JP | 2008-308619 A | 12/2008 |
| JP | 2013-204211 A | 10/2013 |
| KR | 10-2002-0064176 A | 8/2002 |
| KR | 20090075811 A | 7/2009 |
| WO | WO-90/007526 A1 | 7/1990 |
| WO | WO-98/49211 | 11/1998 |
| WO | WO-2007/094378 A1 | 8/2007 |
| WO | WO-2008/152935 A1 | 12/2008 |
| WO | WO-2013/039850 A1 | 3/2013 |

OTHER PUBLICATIONS

International Search Report for PCT/JP2015/053094 dated Apr. 21, 2015.
Chinese Office Action issued in Chinese Patent Application No. 201580002930.3 dated May 19, 2017.
US 5,168,111, 12/1992, Canich, Jo Ann M. (withdrawn).
Korean Office Action dated Jan. 19, 2018 in corresponding application No. 20167018481.
Extended European Search Report issued in EP patent application No. 15755722.4 dated Sep. 25, 2017.

* cited by examiner

US 10,004,293 B2

CROSSLINKED PRODUCT, METHOD FOR PRODUCING THE SAME AND THE USE THEREOF, AND ETHYLENE COPOLYMER

CROSS-REFERENCE TO RELATED APPLICATIONS

The present application is a U.S. national stage application claiming the benefit of International Patent Application No. PCT/JP2015/053094, filed Feb. 4, 2015, which claims the benefit of priority to Japanese Patent Application No. 2014-039349, filed Feb. 28, 2014, the entireties of which are hereby incorporated by reference.

TECHNICAL FIELD

The present invention relates to a method for producing a crosslinked product, a crosslinked product, use thereof, an ethylene copolymer, and an ethylene copolymer composition.

BACKGROUND ART

An ethylene α-olefin copolymer has been conventionally used in various applications.

For example, it is known that a crosslinked product obtained by crosslinking the ethylene α-olefin copolymer after being melt molded, is used in electric cable coverings and wall papers (See Patent Documents 1 and 2).

Further, since a crosslinked foamed product using an ethylene α-olefin copolymer has a high mechanical strength and is light weight and flexible, it is used in interior and exterior materials for construction, automotive parts such as door glass run channels, packaging materials, daily necessities and the like. Attempts have also been made to use it for footwear or footwear parts, such as soles (mainly, midsoles) for sports shoes and the like. When used in footwear or footwear parts, among others, requirements such as being light weight and having an excellent durability need to be met. Patent Document 3 discloses an ethylene α-olefin copolymer having a low specific gravity and low compression set, a crosslinked molded article made therefrom, and a footwear part made therefrom. Further, Patent Document 4 discloses a crosslinked molded article obtained from an ethylene/α-olefin copolymer composition, having an improved compression set.

CITATION LIST

Patent Documents

Patent Document 1: Japanese Laid-Open Patent Publication No. H06-87990
Patent Document 2: Japanese Laid-Open Patent Publication No. 2013-204211
Patent Document 3: Japanese Laid-Open Patent Publication No. 2008-308619
Patent Document 4: International Publication No. 2013/039850 pamphlet

SUMMARY OF THE INVENTION

Problems to be Solved by the Invention

The investigation by the present inventors has revealed that, when a conventional ethylene copolymer is melt molded and crosslinked to produce a molded article, there are cases where the resulting molded article has a poor appearance due to problems in moldability. Further, there are cases where an effort to widen the molecular weight distribution of the polymer in order to improve the moldability results in poor physical properties of the molded article. Further, in the crosslinked molded article obtained from a composition of an ethylene copolymer having a low vinyl group content, such as the ethylene/α-olefin copolymer disclosed in Patent Document 4, there are cases where the physical properties thereof such as tensile strength and tear strength do not meet the requirements.

Conventionally, when such a material for the crosslinked molded article is used to produce parts for footwear or clothing, a method has been mainly used in which a compound containing a crosslinking agent and a foaming agent is molded to produce a foamable sheet, and the obtained sheet is cut and placed in a mold to obtain a primary foamed product, which is then subjected to compression molding, as required, to impart a pre-determined shape.

From the viewpoint of reducing the production cost, on the other hand, it is preferred that the product be capable of being produced by injection molding, transfer molding or the like. It is particularly preferred that the product be capable of being produced by injection molding or transfer molding, because number of people and steps required for the production can be reduced. However, the investigation by the present inventors has revealed that, when a composition containing single ethylene/α-olefin copolymer is subjected to crosslinking foaming, for example by injection molding, dimensional variations among a plurality of the resulting molded articles are observed.

An object of the present invention is to provide a method for producing a crosslinked product excellent in moldability and in physical properties and appearance after being crosslinked, using an ethylene α-olefin copolymer; and to provide an ethylene α-olefin copolymer which is formed into a crosslinked product having an excellent moldability and excellent physical properties. Another object of the present invention is to provide a foamed product having sufficient mechanical strength, to reduce dimensional variations among the obtained foamed products, and to provide an ethylene α-olefin copolymer which is formed into the foamed product, when producing the crosslinked foamed product through a molding step such as injection molding or a transfer molding.

Means for Solving the Problems

The present invention relates to the following items [1] to [14].

[1] A method for producing a crosslinked product, comprising the steps of:
melt molding an ethylene copolymer (A) or a resin composition containing the ethylene copolymer (A); and
carrying out crosslinking;
wherein the ethylene copolymer (A) contains a constitutional unit derived from ethylene and a constitutional unit derived from an α-olefin having from 3 to 20 carbon atoms, and satisfies all of the following requirements (1), (2) and (3):
(1) a vinyl group content per 1,000 carbon atoms as measured by $^1$H-NMR is 0.06 or more and one or less;
(2) a ratio $MFR_{10}/MFR_{2.16}$ is 8.5 or more and 50 or less; and
(3) a density d is 850 kg/m$^3$ or more and 920 kg/m$^3$ or less (wherein, $MFR_{10}$ represents a melt flow rate (g/10 min) as measured in accordance with ASTM D1238 at a load of 10 kg and at a temperature of 190° C.; and $MFR_{2.16}$ represents a melt flow rate (g/10 min) as measured in accordance with ASTM D1238 at a load of 2.16 kg and at a temperature of 190° C.)

[2] The method for producing a crosslinked product according to the item [1], wherein the ethylene copolymer (A) further satisfies the following requirement (4):

(4) $MFR_{2.16}$ is within the range of from 0.01 to 200 g/10 min.

[3] The method for producing a crosslinked product according to the item [1] or [2], wherein the ethylene copolymer (A) is an ethylene copolymer (A1) obtained by using ethylene and α-olefin alone as monomers.

[4] The method for producing a crosslinked product according to any one of the items [1] to [3], further comprising the step of carrying out foaming.

[5] The method for producing a crosslinked product according to anyone of the items [1] to [3], wherein the step of melt molding is carried out by injection molding or transfer molding, and wherein the method further comprises the step of carrying out foaming.

[6] A crosslinked product obtained by the method for producing a crosslinked product according to any one of the items [1] to [5].

[7] A laminated molded article comprising a layer composed of one or more kinds of raw materials selected from the group consisting of polyolefin, polyurethane, rubber, leather and artificial leather, and the crosslinked product according to item [6], wherein the layer composed of one or more kinds of raw materials and the crosslinked product are laminated together.

[8] The laminated molded article according to the item [7], wherein the laminated molded article is a footwear part.

[9] The laminated molded article according to the item [8], wherein the footwear part is a midsole, an inner sole, or a sole.

[10] An ethylene copolymer (A) which contains a constitutional unit derived from ethylene and a constitutional unit derived from an α-olefin having from 3 to 20 carbon atoms, and which satisfies all of the following requirements (1), (2) and (3):

(1) a vinyl group content per 1,000 carbon atoms as measured by $^1$H-NMR is 0.06 or more and one or less;
(2) a ratio $MFR_{10}/MFR_{2.16}$ is 8.5 or more and 50 or less; and
(3) a density d is 850 kg/m$^3$ or more and 920 kg/m$^3$ or less (wherein, $MFR_{10}$ represents a melt flow rate (g/10 min) as measured in accordance with ASTM D1238 at a load of 10 kg and at a temperature of 190° C.; and $MFR_{2.16}$ represents a melt flow rate (g/10 min) as measured in accordance with ASTM D1238 at a load of 2.16 kg and at a temperature of 190° C.).

[11] The ethylene copolymer (A) according to the item [10], wherein the ethylene copolymer (A) further satisfies the following requirement (4):

(4) $MFR_{2.16}$ is within the range of from 0.01 to 200 g/10 min.

[12] The ethylene copolymer (A) according to the item [10] or [11], wherein the ethylene copolymer (A) is an ethylene copolymer (A1) obtained by using ethylene and α-olefin alone as monomers.

[13] An ethylene copolymer composition comprising the ethylene copolymer (A) according to any one of the items [10] to [12] and a crosslinking agent (C).

[14] The ethylene copolymer composition according to the item [13], further comprising a foaming agent (D).

Effect of the Invention

The method for producing a crosslinked product according to the present invention is capable of providing a crosslinked product having a good moldability and an excellent mechanical strength.

Further, the present method is capable of providing a foamed product which is light weight and excellent in mechanical strength, with an excellent productivity; as well as providing crosslinked molded articles whose dimensional variations between individual products are small.

The crosslinked product of the present invention is excellent in appearance and mechanical strength.

The crosslinked foamed product of the present invention is excellent in mechanical strength, light weight and flexible, and excellent in durability. Therefore, the crosslinked foamed product of the present invention and a laminated molded article using the same is suitably used for footwear parts.

Further, the ethylene copolymer (A) of the present invention is suitably used for producing the above mentioned crosslinked product or crosslinked foamed product. The ethylene copolymer (A) of the present invention is excellent in crosslinking properties, and when used for producing a crosslinked product, the obtained crosslinked product has an excellent moldability. When used for producing a crosslinked foamed product, the obtained foamed product has a good dimensional stability, and an excellent productivity is obtained. Further, the obtained crosslinked product or the crosslinked foamed product has an excellent mechanical strength.

MODE FOR CARRYING OUT THE INVENTION

Hereinafter, the present invention will be described in detail.

<Production Method of Crosslinked Product>

In the present description, unless otherwise specified, the crosslinked product includes both an unfoamed crosslinked product and foamed crosslinked product. In the production of the crosslinked product of the present invention, an ethylene copolymer (A) is used as an essential component, and the ethylene copolymer (A) may be used alone, or a resin composition containing the ethylene copolymer (A) may be used. In addition to the ethylene copolymer (A), another resin component (B), a crosslinking agent (C), a foaming agent (D) and optional components such as additives are used in the resin composition, as necessary.

Ethylene Copolymer (A)

The ethylene copolymer (A) according to the present invention contains a constitutional unit derived from ethylene and a constitutional unit derived from an α-olefin having from to 20 carbon atoms, and satisfies all of the following requirements (1), (2) and (3). Further, the ethylene copolymer (A) according to the present invention preferably satisfies the following requirement (4), in addition to the following requirements (1), (2), and (3).

(1) The vinyl group content per 1,000 carbon atoms as measured by $^1$H-NMR is 0.06 or more and one or less.
(2) The ratio $MFR_{10}/MFR_{2.16}$ is 8.5 or more and 50 or less.
(3) The density d is 850 kg/m$^3$ or more and 920 kg/m$^3$ or less.
(4) $MFR_{2.16}$ is within the range of from 0.01 to 200 g/10 min.

In the present invention, $MFR_{10}$ represents a melt flow rate (g/10 min) as measured in accordance with ASTM D1238 at a load of 10 kg and at a temperature of 190° C.;

and $MFR_{2.16}$ represents a melt flow rate (g/10 min) as measured in accordance with ASTM D1238 at a load of 2.16 kg and at a temperature of 190° C.

The ethylene copolymer (A) according to the present invention contains a constitutional unit derived from ethylene and a constitutional unit derived from an α-olefin having from 3 to 20 carbon atoms. The ethylene copolymer (A) of the present invention is not particularly limited as long as it contains a constitutional unit derived from ethylene and a constitutional unit derived from an α-olefin having from 3 to 20 carbon atoms. The ethylene copolymer (A) may be a copolymer composed solely of ethylene and an α-olefin having from 3 to 20 carbon atoms, and it may also contain a constitutional unit derived from compounds other than ethylene and α-olefins.

Examples of the α-olefin having from 3 to 20 carbon atoms include propylene, 1-butene, 1-pentene, 3-methyl-1-butene, 4-methyl-1-pentene, 1-hexene, 1-octene, 1-decene, 1-dodecene, 1-tetradecene and the like. The α-olefin having from 3 to 20 carbon atoms is preferably an α-olefin having from 3 to 10 carbon atoms. The α-olefin having from 3 to 20 carbon atoms, which is a copolymerization component, may be of one kind alone, or of two or more kinds.

Further, the ethylene copolymer (A) according to the present invention may contain a constitutional unit derived from a non-conjugated diene containing a vinyl group. Examples of the non-conjugated diene include vinylnorbornene. In the present invention, the ethylene copolymer (A) is preferably composed solely of a constitutional unit derived from ethylene and a constitutional unit derived from an α-olefin having from 3 to 20 carbon atoms, from the viewpoint that the polymer can be easily produced and that the amount of gel in the polymer is reduced.

In the ethylene copolymer (A) according to the present invention, the ratio of the constitutional unit derived from ethylene and the constitutional unit derived from an α-olefin having from 3 to 20 carbon atoms may be selected as appropriate so as to satisfy the density range described in the requirement (3). Usually, the ratio of the constitutional unit derived from ethylene is from 50 to 95% by mole, based on 100% by mole of the total amount of the constitutional unit derived from ethylene and the constitutional unit derived from an α-olefin. The lower limit of the amount of the constitutional unit derived from ethylene is preferably 60% by mole, more preferably 75% by mole, and still more preferably 80% by mole.

Vinyl Group Content

The ethylene copolymer (A) according to the present invention has a vinyl group content per 1,000 carbon atoms as measured by $^1$H-NMR of 0.06 or more and one or less (requirement (1)).

The lower limit of the vinyl group content per 1,000 carbon atoms of the ethylene copolymer (A) according to the present invention is usually 0.06, preferably 0.07, more preferably 0.08, and still more preferably 0.09. The upper limit of the vinyl group content per 1,000 carbon atoms of the ethylene copolymer (A) according to the present invention is 1, preferably 0.50, and more preferably 0.25. The vinyl group content within the above range is preferred, from the viewpoint that it improves the mechanical strength of the resulting molded article. The reason for the fact that the molded article obtained from the ethylene polymer (A) of the present invention has an excellent mechanical strength, due to the high vinyl group content of the polymer, will be discussed in detail also in the section describing the production of the crosslinked product. The specific measurement method of the vinyl group content and the vinylidene group content described later will be described in detail in the section explaining the measurement method in Examples described later.

Vinylidene Group Content

The ethylene copolymer (A) according to the present invention usually has a vinylidene group content per 1,000 carbon atoms as measured by $^1$H-NMR of 0.05 or more and 1.00 or less, but not particularly limited thereto. The lower limit of the vinylidene group content per 1,000 carbon atoms of the ethylene copolymer (A) is usually 0.05, preferably 0.06, and more preferably 0.07. The upper limit thereof is usually 1.00, preferably 0.50, and more preferably 0.35.

$MFR_{10}/MFR_{2.16}$

The ethylene copolymer (A) according to the present invention has a ratio $MFR_{10}/MFR_{2.16}$ of 8.5 or more and 50 or less (requirement (2)).

The ratio $MFR_{10}/MFR_{2.16}$ of the ethylene copolymer (A) according to the present invention is usually 8.5 or more, preferably greater than 8.5, more preferably 8.6 or more, and still more preferably 8.7 or more. The upper limit of the ratio $MFR_{10}/MFR_{2.16}$ of the ethylene copolymer (A) is usually 50, preferably 25, more preferably 13, and still more preferably 12.

As used herein, $MFR_{10}$ represents the melt flow rate (g/10 min) measured at a load of 10 kg and at a temperature of 190° C.; and $MFR_{2.16}$ represents the melt flow rate (g/10 min) measured at a load of 2.16 kg and at a temperature of 190° C. The ratio $MFR_{10}/MFR_{2.16}$ is a value considered to serve as one of the indices representing the degree of long chain branching of the copolymer.

If the value of the ratio $MFR_{10}/MFR_{2.16}$ of the ethylene copolymer is less than 8.5, for example, when a composition containing the ethylene copolymer along with components such as a foaming agent and a crosslinking agent and the like is subjected to injection molding and foaming to produce a crosslinked foamed product, there are cases where the obtained crosslinked foamed product has a low shape accuracy, and the dimensional variations among the crosslinked foamed products are observed. If the value of the ratio $MFR_{10}/MFR_{2.16}$ of the ethylene copolymer is too large, exceeding 50, although the degree of dimensional variations is slightly improved, the physical properties of the obtained foamed molded article such as strength may be reduced, and therefore it is not preferred.

Density

The ethylene copolymer (A) according to the present invention has a density d of 850 kg/m$^3$ or more and 920 kg/m$^3$ or less (requirement (3)).

The density d of the ethylene copolymer (A) according to the present invention is usually in the range of from 850 to 920 kg/m$^3$, preferably from 850 to 910 kg/m$^3$, more preferably from 855 to 910 kg/m$^3$, and still more preferably from 857 to 905 kg/m$^3$.

The density d preferably satisfies the above range, because a crosslinked product or a crosslinked foamed product excellent in balance between the flexibility and strength is more likely obtained.

The density d as used in the present invention is a value measured in accordance with ASTM D1505 at a temperature of 23° C.

MFR (Melt Flow Rate)

It is preferred that $MFR_{2.16}$ (the melt flow rate measured at a load of 2.16 kg and at a temperature of 190° C.) of the ethylene copolymer (A) according to the present invention be within the range of from 0.01 to 200 g/10 min, but not particularly limited thereto (requirement (4)).

The value of MFR of the ethylene copolymer (A) according to the present invention can be selected as appropriate depending on the application, preferably within the above range. The $MFR_{2.16}$ of the ethylene copolymer (A) according to the present invention is preferably within the range of from 0.01 to 200 g/10 min, more preferably from 0.1 to 100 g/10 min, still more preferably from 0.1 to 40 g/10 min, even more preferably from 0.1 to 25 g/10 min, and particularly preferably from 0.1 to 10 g/10 min, but not particularly limited thereto. Further, the $MFR_{2.16}$ the ethylene copolymer (A) is also preferably 2.0 or more. The larger the molecular weight of the ethylene copolymer (A), the smaller the value of $MFR_{2.16}$. The method for controlling the molecular weight will be described in the "Production of ethylene copolymer (A)" section. It is preferred that the value of $MFR_{2.16}$ be equal to or lower than the above mentioned upper limit, from the viewpoint that it improves the strength of the resulting molded article. It is preferred that the value of $MFR_{2.16}$ be equal to or higher than the above mentioned lower limit, from the viewpoint that it improves the fluidity of the ethylene polymer (A) upon melt molding.

Mw/Mn

The ethylene copolymer (A) according to the present invention preferably has a molecular weight distribution (Mw/Mn), which is calculated as the ratio of the weight-average molecular weight Mw and the number average molecular weight Mn obtained by gel permeation chromatography (GPC), of from 1.5 to 3.5, and more preferably of from 1.5 to 3.0, but not particularly limited thereto. The Mw/Mn can be controlled to be in the above mentioned range by appropriately selecting the polymerization catalyst as described in the section of "olefin polymerization catalyst". The Mw/Mn within the above range is preferred from the viewpoint that it improves the melt moldability and the strength of the resulting molded article.

Production of Ethylene Copolymer (A)

The ethylene copolymer (A) according to the present invention can be any ethylene copolymer which satisfies the above requirements (1), (2) and (3), and it can be suitably produced, for example, by copolymerizing ethylene with at least one α-olefin having from 3 to 20 carbon atoms in the presence of an olefin polymerization catalyst, but not particularly limited thereto.

Olefin Polymerization Catalyst

The ethylene copolymer (A) of the present invention has the above described properties, and the production method thereof is not particularly limited. The ethylene copolymer (A) can be produced, for example, by copolymerizing ethylene with one or more kinds selected from α-olefins having from 3 to 20 carbon atoms in the presence of an olefin polymerization catalyst composed of the following catalyst components [A] and [B].

[A] A crosslinked metallocene compound represented by the following general formula [I]:

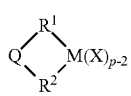

[I]

(wherein in the formula [I], M represents a transition metal; p represents a valence of a transition metal; X may be the same or different and each represents a hydrogen atom, a halogen atom or a hydrocarbon group; $R^1$ and $R^2$ may be the same or different from each other and each represents a n-electron conjugated ligand coordinated to M, and Q represents a divalent group crosslinking two n-electron conjugated ligands $R^1$ and $R^2$).

[B] At least one kind of compound selected from (b-1) an organoaluminum oxy compound (b-1), a compound (b-2) forming an ion pair by reacting with the metallocene compound [A], and an organoaluminum compound (b-3).

The copolymerization may be carried out, for example, by solution polymerization of ethylene and one or more kinds of monomers selected from α-olefins in the presence of such an olefin polymerization catalyst at a temperature range of from 0 to 200° C. under the coexistence of a solvent.

However, the ethylene copolymer (A) according to the present invention may be produced without any limitation on the production method as long as the above mentioned properties are satisfied. The ethylene copolymer (A) may be prepared, for example, by using a metallocene compound having a structure different from the formula [I] or a co-catalyst other than the catalyst component [B] in the copolymerization, or by a technique of reactor blending, physical blending or the like using well-known two or more kinds of ethylene copolymers.

Hereinafter, the above mentioned method for producing the ethylene copolymer (A) will further be described in which ethylene and one or more kinds selected from α-olefins having 3 to 20 carbon atoms are copolymerized in the presence of an olefin polymerization catalyst containing the catalyst components [A] and [B].

Catalyst Component [A]

The catalyst component [A] is a crosslinked metallocene compound represented by the formula [I]. In the Formula [I], examples of the transition metal represented by M include Zr, Ti, Hf, V, Nb, Ta and Cr; and preferred transition metal is Zr, Ti or Hf, and more preferred transition metal is Zr or Hf.

In the general formula [I], examples of the n-electron conjugated ligand represented by $R^1$ and $R^2$ include a ligand having an η-cyclopentadienyl structure, an η-benzene structure, an η-cycloheptatrienyl structure and an η-cyclooctatetraene structure. A ligand having an η-cyclopentadienyl structure is particularly preferred. Examples of the ligand having an η-cyclopentadienyl structure include cyclopentadienyl group, indenyl group, hydrogenated indenyl group, fluorenyl group and the like. These groups may be further substituted with a halogen atom; a hydrocarbon group such as alkyl group, aryl group, aralkyl group, alkoxy group and aryloxy group; a hydrocarbon group-containing silyl group such as a trialkyl silyl group; a chain or cyclic alkylene group; and the like.

In the general formula [I], a group crosslinking $R^1$ and $R^2$ represented by Q is not particularly limited as long as it is a divalent group. Examples thereof include linear or branched alkylene groups, unsubstituted or substituted cycloalkylene groups, alkylidene groups, unsubstituted or substituted cycloalkylidene groups, unsubstituted or substituted phenylene groups, silylene group, dialkyl-substituted silylene groups, germyl group, dialkyl-substituted germyl groups, and the like.

The catalyst component [A] may be specifically exemplified by the metallocene complexes used in Examples described later, but is not limited to these compounds.

Such a catalyst component [A] is preferably used as an olefin polymerization catalyst together with a catalyst component [B].

Catalyst Component [B]

When the catalyst component [A] is used as a component of an olefin polymerization catalyst for producing the ethylene copolymer (A), the olefin polymerization catalyst preferably contains a catalyst component [B] constituted of at least one kind of compound selected from an organoaluminum oxy compound (b-1), a compound (b-2) forming an ion pair by reacting with the catalyst component [A] and an organoaluminum compound (b-3). Here, the catalyst component [B] is preferably used in any of the following embodiments [c1] to [c4] from the viewpoint of polymerization activity and the properties of the resulting olefin polymer:

[c1] an organoaluminum oxy compound (b-1) only,

[c2] an organoaluminum oxy compound (b-1) and an organoaluminum compound (b-3),

[c3] a compound (b-2) forming an ion pair by reacting with the catalyst component [A] and an organoaluminum compound (b-3), and

[c4] an organoaluminum oxy compound (b-1) and a compound (b-2) forming an ion pair by reacting with the catalyst component [A].

However, when a metallocene compound in which Q in the general formula [I] is a silylene group is used as the catalyst component [A], a compound (b-2) forming an ion pair by reacting with the catalyst component [A] is not used as the component [B], and only [c1] and [c2] in the above [c1] to [c4] are used as the preferred component [B].

Hereinafter, respective components capable of constituting the catalyst component [B] will be specifically described.

Organoaluminum Oxy Compound (b-1)

As the organoaluminum oxy compound (b-1), a conventionally known aluminoxane may be used as it is. Specifically, there may be mentioned a compound represented by the following general formulae [II] and/or [III]:

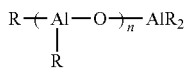

[II]

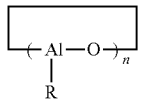

[III]

There may be mentioned a compound represented by the general formula [II] or [III] (wherein in the formula [II] or [III], R represents a hydrocarbon group having 1 to 10 carbon atoms and n represents an integer of two or more), and particularly a methylaluminoxane in which R is a methyl group and n is a number of 3 or more and preferably 10 or more is used. (Hereinafter, an organoaluminum oxy compound in which R is a methyl group in the general formula [II] or [III] may be referred to as a "methylaluminoxane".)

Further, as the organoaluminum oxy compound (b-1), a methylaluminoxane analogue which is soluble in a saturated hydrocarbon is also preferably used, and a modified methylaluminoxane represented by the following general formula [IV] may be mentioned, for example:

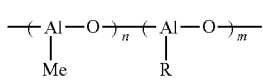

[IV]

(wherein in the formula [IV], R represents a hydrocarbon group having 2 to 20 carbon atoms, and m and n represent an integer of two or more.)

The modified methylaluminoxane represented by the general formula [IV] is prepared using trimethylaluminum and alkylaluminum other than the trimethylaluminum (for example, the production method is disclosed in U.S. Pat. No. 4,960,878, U.S. Pat. No. 5,041,584 and the like) and is commercially produced under the trade name of MMAO and TMAO in which R is an isobutyl group, which is prepared using trimethylaluminum and triisobutylaluminum by a manufacturer such as Toso Finechem Corporation and the like (for example, see "Toso Research and Technology Report" Vol. 47, 55 (2003)).

Further, as the organoaluminum oxy compound (b-1), an organoaluminum oxy compound insoluble in benzene may also be used, which is mentioned in Japanese Laid-Open Patent Publication No. H02-78687, and an organoaluminum oxy compound containing boron represented by the following general formula [V] may also be used:

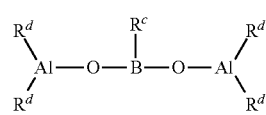

[V]

(wherein in the formula [V], $R^c$ represents a hydrocarbon group having 1 to 10 carbon atoms. $R^d$ may be the same or different from each other and represents a hydrogen atom, a halogen atom or a hydrocarbon group having from 1 to 10 carbon atoms.)

Further, the above described organoaluminum oxy compound (b-1) may contain a slight amount of an organoaluminum compound.

Compound (b-2) Forming an Ion Pair by Reacting with Catalyst Component [A]

As the compound (b-2) forming an ion pair by reacting with the catalyst component [A] (hereinafter, may be abbreviated as an "ionic compound (b-2)"), there may be mentioned a Lewis acid, an ionic compound, a borane compound, a carborane compound and the like, which are described in Japanese Laid-Open Patent Publication No. H01-501950, Japanese Laid-Open Patent Publication No. H01-502036, Japanese Laid-Open Patent Publication No. H03-179005, Japanese Laid-Open Patent Publication No. H03-179006, Japanese Laid-Open Patent Publication No. H03-207703, Japanese Laid-Open Patent Publication No. H03-207704, U.S. Pat. No. 5,321,106 and the like. Further, as the ionic compound (b-2), there may be mentioned a heteropoly compound and an isopoly compound.

In the present invention, an ionic compound (b-2) which is preferably used is a compound represented by the following general formula [VI]:

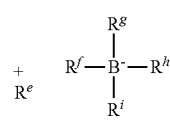

[VI]

wherein in the formula [VI], examples of $R^{e+}$ include $H^+$, a carbenium cation, an oxonium cation, an ammonium cation, a phosphonium cation, a cycloheptyltrienyl cation, a ferrocenium cation having a transition metal and the like. $R^f$ to $R^i$ may be the same or different from each other, and is an organic group, and preferably an aryl group.

Specific examples of the carbenium cation include trisubstituted carbenium cations such as triphenylcarbenium cation, tris(methylphenyl)carbenium cation, tris(dimethylphenyl)carbenium cation and the like.

Specific examples of the ammonium cation include trialkylammonium cations such as trimethylammonium cation, triethylammonium cation, tri(n-propyl)ammonium cation, triisopropylammonium cation, tri(n-butyl) ammonium cation, and triisobutylammonium cation; N,N-dialkylanilinium cations such as N,N-dimethylanilinium cation, N,N-diethylanilinium cation, and N,N-2,4,6-pentamethylanilinium cation; dialkylammonium cations such as diisopropylammonium cation and dicyclohexylammonium cation; and the like.

Specific examples of the phosphonium cation include triarylphosphonium cations such as triphenylphosphonium cation, tris(methylphenyl)phosphonium cation, and tris(dimethylphenyl)phosphonium cation; and the like.

Among those mentioned above, $R^{e+}$ is preferably a carbenium cation, an ammonium cation and the like and particularly preferably a triphenylcarbenium cation, an N,N-dimethylanilinium cation and an N,N-diethylanilinium cation.

Specific examples of the ionic compound (b-2) which is a carbenium salt include triphenylcarbenium tetraphenylborate, triphenylcarbenium tetrakis(pentafluorophenyl)borate, triphenylcarbenium tetrakis(3,5-ditrifluoromethylphenyl)borate, tris(4-methylphenyl)carbenium tetrakis(pentafluorophenyl)borate, tris(3,5-dimethylphenyl)carbenium tetrakis(pentafluorophenyl)borate and the like.

Examples of the ionic compound (b-2) which is an ammonium salt include a trialkyl-substituted ammonium salt, an N,N-dialkylanilinium salt, a dialkylammonium salt and the like.

Specific examples of the ionic compound (b-2) which is a trialkyl-substituted ammonium salt include triethylammonium tetraphenyl borate, tripropylammonium tetraphenyl borate, tri(n-butyl)ammonium tetraphenyl borate, trimethylammonium tetrakis(p-tolyl)borate, trimethylammonium tetrakis(o-tolyl)borate, tri(n-butyl)ammonium tetrakis(pentafluorophenyl)borate, triethylammonium tetrakis(pentafluorophenyl)borate, tripropylammonium tetrakis(pentafluorophenyl)borate, tripropylammonium tetrakis(2,4-dimethylphenyl)borate, tri(n-butyl)ammonium tetrakis(3,5-dimethylphenyl)borate, tri(n-butyl)ammonium tetrakis(4-trifluoromethylphenyl)borate, tri(n-butyl)ammonium tetrakis(3,5-ditrifluoromethylphenyl)borate, tri(n-butyl)ammonium tetrakis(o-tolyl)borate, dioctadecylmethylammonium tetraphenylborate, dioctadecylmethylammonium tetrakis(p-tolyl)borate, dioctadecylmethylammonium tetrakis(o-tolyl)borate, dioctadecylmethylammonium tetrakis(pentafluorophenyl)borate, dioctadecylmethylammonium tetrakis(2,4-dimethylphenyl)borate, dioctadecylmethylammonium tetrakis(3,5-dimethylphenyl)borate, dioctadecylmethylammonium tetrakis(4-trifluoromethylphenyl)borate, dioctadecylmethylammonium tetrakis(3,5-ditrifluoromethylphenyl)borate, dioctadecylmethylammonium and the like.

Specific examples of the ionic compound (b-2) which an N,N-dialkyl anilinium salt include N,N-dimethylanilinium tetraphenylborate, N,N-dimethylanilinium tetrakis(pentafluorophenyl)borate, N,N-dimethylanilinium tetrakis(3,5-ditrifluoromethylphenyl)borate, N,N-diethylanilinium tetraphenylborate, N,N-diethylanilinium tetrakis(pentafluorophenyl)borate, N,N-diethylanilinium tetrakis(3,5-ditrifluoromethylphenyl)borate, N,N-2,4,6-pentamethylanilinium tetraphenylborate, N,N-2,4,6-pentamethylanilinium tetrakis(pentafluorophenyl)borate and the like.

Specific examples of the dialkyl ammonium salt include di(1-propyl)ammonium tetrakis(pentafluorophenyl)borate, dicyclohexylammonium tetraphenylborate and the like.

As other ionic compounds (b-2), the ionic compounds disclosed by the present applicant (Japanese Laid-Open Patent Publication No. 2004-51676) can be used without any restriction.

The above mentioned ionic compounds (b-2) may be used alone or as a mixture of two or more kinds thereof.

Organoaluminum Compound (b-3)

Examples of the organoaluminum compound (b-3) include an organoaluminum compound represented by the following general formula [VII], an alkylated complex of a metal of Group 1 of the Periodic Table and aluminum, which is represented by the following formula [VIII], and the like.

$$R^a{}_m Al(OR^b)_n H_p X_q \qquad [VII]$$

(wherein in the formula [VII], $R^a$ and $R^b$ may be the same or different from each other and each represents a hydrocarbon group having from 1 to 15 carbon atoms and preferably from 1 to 4 carbon atoms; X represents a halogen atom; and m, n, p, and q are numbers satisfying the conditions: $0<m\le 3$, $0\le n<3$, $0\le p<3$, $0\le q<3$, and $m+n+p+q=3$).

Specific examples of the organoaluminum compound represented by the formula [VII] include tri-n-alkylaluminums such as trimethylaluminum, triethylaluminum, tri-n-butylaluminum, trihexylaluminum, and trioctylaluminum; tri-branched-chain alkylaluminums such as tri-isopropylaluminum, tri-isobutylaluminum, tri-sec-butylaluminum, tri-tert-butylaluminum, tri-2-methylbutyl aluminum, tri-3-methyl hexyl aluminum, and tri-2-ethylhexylaluminum; tri-cycloalkylaluminums such as tri-cyclohexylaluminum, and tri-cyclooctylaluminum; triarylaluminums such as triphenylaluminum and tritolylaluminum; dialkylaluminum hydrides such as diisopropylaluminum hydride and diisobutylaluminum hydride; alkenylaluminums such as isoprenylaluminum represented by the general formula: $(i-C_4H_9)_x Al_y (C_5H_{10})_z$ (wherein, x, y and z are positive integers, and z is a number satisfying the condition: $z\le 2x$) and the like; alkylaluminum alkoxides such as isobutylaluminum methoxide and isobutylaluminum ethoxide; dialkylaluminum alkoxides such as dimethylaluminum methoxide, diethylaluminum ethoxide, and dibutylaluminum butoxide; alkylaluminum sesquialkoxides such as ethylaluminum sesquiethoxide and butylaluminum sesquibutoxide; partially alkoxylated alkylaluminums having an average composition represented by the general formula $R^a{}_{2.5} Al(OR^b)_{0.5}$ and the like; alkylaluminum aryloxides such as diethylaluminum phenoxide, and diethylaluminum(2,6-di-t-butyl-4-methylphenoxide); dialkylaluminum halides such as dimethylaluminum chloride, diethylaluminum chloride, dibutylaluminum chloride, diethylaluminum bromide, and diisobutylaluminum chloride; alkylaluminum sesquihalides such as ethylaluminum sesquichloride, butylaluminum sesquichloride, and ethylaluminum sesquibromide; partially halogenated alkylaluminums, for example, alkylaluminum dihalides such as ethylaluminum dichloride; dialkylaluminum hydrides such as diethylaluminum hydride and dibutylaluminum hydride; other partially hydrogenated alkylaluminums, for example, alkylaluminum dihydrides such as ethylaluminum dihydride and propylaluminum dihydride; partially alkoxylated and halogenated alkylaluminums such as ethylaluminum ethoxychloride, butylaluminum butoxychloride and ethylaluminum ethoxybromide; and the like.

$$M^2AlR^a{}_4 \qquad [VIII]$$

An alkylated complex of a metal of Group 1 of the Periodic Table and aluminum, represented by the formula [VIII] (wherein in the formula [VIII], $M^2$ represents Li, Na, or K, and $R^a$ represents a hydrocarbon group having from 1 to 15 carbon atoms and preferably from 1 to 4 carbon atoms). Examples of such compounds include $LiAl(C_2H_5)_4$, $LiAl(C_7H_{15})_4$ and the like.

In addition, a compound similar to the compound represented by the formula [VII] can also be used. Examples thereof include an organoaluminum compound in which two or more aluminum compounds are bonded via a nitrogen atom. Specific examples of such a compound include $(C_2H_5)_2AlN(C_2H_5)Al(C_2H_5)_2$ and the like.

As the organoaluminum compound (b-3), trimethylaluminum and tri-isobutyl aluminum are preferably used, from the viewpoint of easy availability.

Production of Ethylene Copolymer (A)

The ethylene copolymer (A) according to the present invention may be suitably produced by copolymerizing ethylene with at least one kind of α-olefin having 3 to 20 carbon atoms in the presence of the above mentioned olefin polymerization catalyst. The copolymerization can be carried out, for example, by performing solution polymerization in the presence of a solvent. Here, the polymerization temperature is 140° C. or higher, for example, and preferably 150° C. or higher, but not particularly limited thereto. It is preferred that the polymerization reaction be carried out at a temperature as mentioned above, because the value of the ratio $MFR_{10}/MFR_{2.16}$ and the vinyl group content of the obtained ethylene copolymer (A) can be increased.

When carrying out the polymerization, the method for using each of the components and the sequence of addition are selected arbitrarily. For example, a method in which the catalyst component (A) and the catalyst component (B) are added to a polymerization vessel in an arbitrary order may be mentioned.

In the above mentioned method, two or more of the respective catalyst components may be brought into contact in advance.

When the ethylene copolymer (A) of the present invention is produced by copolymerization of ethylene and at least one kind of α-olefin having 3 to 20 carbon atoms using the olefin polymerization catalyst as mentioned above, the catalyst component [A] is used usually in an amount of from $10^{-9}$ to $10^{-1}$ mol, preferably from $10^{-9}$ to $10^{-2}$ mol per liter of reaction volume.

The component (b-1) is used in an amount such that the molar ratio [(b-1)/M] of the component (b-1) to the total transition metal atoms (M) in the component (A) is usually from 1 to 10,000, and preferably from 10 to 5,000. The component (b-2) is used in an amount such that the molar ratio [(b-2)/M] of the component (b-2) to the total transition metal atoms (M) in the component (A) is usually from 0.5 to 50, and preferably from 1 to 20. The component (b-3) is used in an amount usually from 0 to 5 mmol and preferably approximately from 0 to 2 mmol per liter of polymerization volume.

Here, the feeding molar ratio of ethylene to an α-olefin having 3 to 20 carbon atoms may be selected as appropriate depending on the properties of the intended ethylene copolymer (A). The feeding molar ratio of ethylene:α-olefin is usually from 10:90 to 99.9:0.1, preferably from 30:70 to 99.9:0.1, and more preferably from 50:50 to 95.0:5.0, but not particularly limited thereto.

Examples of the α-olefin having from 3 to 20 carbon atoms include linear or branched α-olefins, such as propylene, 1-butene, 2-butene, 1-pentene, 3-methyl-1-butene, 1-hexene, 4-methyl-1-pentene, 3-methyl-1-pentene, 1-octene, 1-decene, and 1-dodecene. Among these α-olefins, 1-butene, 1-hexene, 4-methyl-1-pentene and 1-octene are particularly preferably used. Among these, an α-olefin having 3 to 10 carbon atoms is more preferably used in the present invention.

The "solution polymerization", which is preferably employed for the production of the ethylene copolymer (A), is a general term used to refer to a method in which polymerization is carried out in a state where a polymer is dissolved in a hydrocarbon solvent that is inert to the copolymerization reaction. In the solution polymerization according to the present invention, the polymerization temperature is usually in the range of from 0 to 200° C., preferably 140° C. or higher, and more preferably 150° C. or higher.

In the solution polymerization according to the present invention, the polymerization temperature of less than 0° C. is impractical in terms of productivity, because the polymerization activity is extremely reduced. Further, there are cases where the vinyl group content of the ethylene copolymer (A) is decreased. If the polymerization temperature is within the range of from 0° C. or higher, as the temperature increases, the solution viscosity during the polymerization is decreased, the removal of the polymerization heat becomes easier, and the vinyl group content of the ethylene copolymer (A) is increased. However, if the polymerization temperature is greater than 200° C., the polymerization activity may be extremely reduced. It is preferred that the polymerization of the ethylene copolymer (A) according to the present invention be carried out at a relatively high temperature of 140° C. or higher, preferably 150° C. or higher, since the ethylene copolymer (A) has a relatively high ratio $MFR_{10}/MFR_{2.16}$ and a relatively high vinyl group content.

The polymerization pressure is usually from normal pressure to 10 MPa gauge pressure, preferably from normal pressure to 8 MPa gauge pressure, and the polymerization reaction may be carried out in any of batch, semi-continuous and continuous processes. The reaction time (average residence time, if the copolymerization reaction is carried out by a continuous process) varies depending on the conditions such as the catalyst concentration and polymerization temperature, and it may be selected as appropriate. It is usually from one minute to 3 hours and preferably from 10 minutes to 2.5 hours. Further, the polymerization may be carried out in two or more stages which have different reaction conditions. The molecular weight of the resulting ethylene copolymer (A) can be controlled by changing the hydrogen concentration or the polymerization temperature in the polymerization system, and also by changing the amount of the catalyst component (B) to be used. When hydrogen is added to the polymerization system, an appropriate amount to be added is approximately from 0.001 to 5,000 NL per 1 kg of the ethylene copolymer to be produced. In addition, the vinyl-group content of the resulting ethylene copolymer (A) can be increased by increasing the polymerization temperature and by significantly reducing the amount of hydrogen added. Further, the ratio $MFR_{10}/MFR_{2.16}$ of the resulting ethylene copolymer (A) serves as an index showing that the larger the value of the ratio, the more long chain branched structure contained in the polymer. However, in the case of coordination polymerization as shown in the Examples described later, it is considered that the long chain branched structure in the ethylene copolymer (A) is produced by reinsertion of a molecular chain (macromonomer) having a terminal vinyl group generated by the β-dehydrogenation reaction. For this reason, the value of the ratio $MFR_{10}/MFR_{2.16}$ of the ethylene copolymer (A) can be controlled by increasing or decreasing the ratio of the macromonomer concentration to the ethylene concentration ([macromonomer]/[ethylene]) in the solution. In general, if the ratio [macromonomer]/[ethylene] is high, the amount of long-chain branching in the ethylene polymer is increased, and if the ratio [macromonomer]/[ethylene] is low, the amount of long-chain branching in the ethylene polymer is decreased. Examples of the technique for increasing or decreasing the ratio [macromonomer]/[ethylene] in the solution include the following [1] to [4].

[1] Polymerization Temperature

The higher the polymerization temperature is, the more likely the β-dehydrogenation reaction occurs. Therefore, if the polymerization temperature is increased, the ratio [macromonomer]/[ethylene] is increased, resulting in an increase in the amount of long chain branching in the ethylene copolymer.

[2] Polymer Concentration

If the polymer concentration in the solution is increased, the macromonomer concentration is relatively increased, which leads to an increase in the ratio [macromonomer]/[ethylene], resulting in an increase in the amount of long chain branching in the ethylene copolymer.

[3] Ethylene Conversion Rate

If the ethylene conversion rate is increased, the ethylene concentration in the solution is decreased, which leads to an increase in the ratio [macromonomer]/[ethylene], resulting in an increase in the amount of long chain branching in the ethylene copolymer.

[4] Solvent Species

If a solvent having a low boiling point is used as the polymerization solvent, the ethylene concentration in the solution is decreased, which leads to an increase in the ratio [macromonomer]/[ethylene], resulting in an increase in the amount of long chain branching in the ethylene copolymer.

In addition to controlling the β-dehydrogenation reaction, the chain transfer reaction to Al and the like can also be controlled to increase and decrease the ratio [macromonomer]/[ethylene]), thereby changing the amount of long chain branching in the ethylene polymer.

The solvent used in the solution polymerization is usually an inert hydrocarbon solvent and preferably a saturated hydrocarbon solvent having a boiling point of from 50 to 200° C. under normal pressure. Specific examples of the solvent include aliphatic hydrocarbons such as pentane, hexane, heptane, octane, decane, dodecane, and kerosene; and alicyclic hydrocarbons such as cyclopentane, cyclohexane, and methylcyclopentane. Also included in the category of the "inert hydrocarbon solvents", which relates to the high temperature solution polymerization of the present invention, are aromatic hydrocarbons such as benzene, toluene and xylene; and halogenated hydrocarbons such as ethylene chloride, chlorobenzene, and dichloromethane; and the use thereof is not restricted. As described above, in the high temperature solution polymerization according to the present invention, not only an organoaluminum oxy compound which is soluble in aromatic hydrocarbons and which has been conventionally and frequently used, but also a modified methylaluminoxane such as MMAO which is soluble in aliphatic hydrocarbons and alicyclic hydrocarbons can be used. As a result, by employing an aliphatic hydrocarbon or an alicyclic hydrocarbon as a solvent for solution polymerization, the possibility that the polymerization system or the resulting ethylene polymer is contaminated with aromatic hydrocarbons can be almost entirely eliminated. In other words, the high temperature solution polymerization method according to the present invention also has characteristics that it allows for reducing the environmental burden and minimizing the impact on human health.

In order to prevent the variations in the physical properties, it is preferred that the ethylene copolymer (A) obtained by the polymerization reaction and optionally added other components be melted, kneaded, and granulated in an arbitrary manner.

Graft Modification

A part or the whole of the ethylene copolymer (A) of the present invention may be graft modified with a polar monomer before use.

Examples of the polar monomer include hydroxyl group-containing ethylenically unsaturated compounds, amino group-containing ethylenically unsaturated compounds, epoxy group-containing ethylenically unsaturated compounds, aromatic vinyl compounds, unsaturated carboxylic acids and derivatives thereof, vinyl ester compounds, vinyl chloride, carbodiimide compounds, and the like.

As the polar monomer, an unsaturated carboxylic acid or a derivative thereof is particularly preferred. Examples of the unsaturated carboxylic acid or derivative thereof include unsaturated compounds having one or more carboxylic groups; esters of compounds having a carboxylic acid group and an alkyl alcohol; unsaturated compounds having one or more carboxylic anhydride groups, and the like. Examples of unsaturated groups include vinyl group, vinylene group, unsaturated cyclic hydrocarbon groups and the like.

Specific examples of compounds include unsaturated carboxylic acids such as acrylic acid, maleic acid, fumaric acid, tetrahydrophthalic acid, itaconic acid, citraconic acid, crotonic acid, isocrotonic acid, and nadic acid (trade mark) (endo-cis-bicyclo[2.2.1]hept-5-ene-2,3-dicarboxylic acid); or derivatives thereof such as acid halides, amides, imides, anhydrides, esters and the like. Specific examples of the derivative include malenyl chloride, maleimide, maleic anhydride, citraconic anhydride, monomethyl maleate, dimethyl maleate, glycidyl maleate and the like.

These unsaturated carboxylic acids and/or derivatives thereof may be used alone or in combination with two or more kinds. Among these, an unsaturated dicarboxylic acid or an acid anhydride thereof is suitable. Particularly, maleic acid, nadic acid or an acid anhydride thereof is preferably used.

Modification is achieved by graft polymerizing a polar monomer to a product to be modified. In the graft polymerization of such a polar monomer to the product to be modified, the polar monomer is used usually in an amount of from 1 to 100 parts by mass and preferably from 5 to 80 parts by mass based on 100 parts by mass of the product to be modified. This graft polymerization is usually performed in the presence of a radical generator.

As the radical generator, for example, the same radical generators as those mentioned in the radical generator (c) described later can be used.

The radical generator may be used, mixed with the product to be modified and the polar monomer as it is, but it may be dissolved in a small amount of an organic solvent before use. As the organic solvent, any organic solvent can be used without particular limitation, as long as it is an organic solvent capable of dissolving the radical generator.

In the graft polymerization of a polar monomer to the product to be modified, a reducing substance may be used. If a reducing substance is used, the grafted amount of the polar monomer can be increased. The graft modification of the product to be modified with a polar monomer can be performed by a conventionally known method.

The modified amount (the grafted amount of the polar monomer) of the modified product thus obtained is usually in the range of from 0.1 to 50% by mass, preferably from 0.2 to 30% by mass and more preferably from 0.2 to 10% by mass, based on 100% by mass of the modified product.

When the ethylene copolymer (A) of the present invention is used after graft modifying a part or the whole thereof with a polar monomer, the resulting copolymer has an excellent adhesiveness to other resins and excellent compatibility, and the wettability of the surface of the resulting molded article may be improved.

Further, if the content of the polar monomer such as an unsaturated carboxylic acid and/or a derivative thereof is within the above range, when the ethylene copolymer (A) of the present invention is used after graft modifying a part of or the whole thereof, the resulting copolymer has a high adhesive strength to a polar group-containing resin (such as polyester, polyvinyl alcohol, ethylene-vinyl alcohol copolymer, polyamide, PMMA, polycarbonate and the like).

In addition, other polymers such as a thermoplastic resin or an elastomer can be blended to a graft-modified ethylene copolymer (A) obtained by graft modifying a part or the whole of the ethylene copolymer (A) of the present invention, to the extent that the properties of the modified product are not impaired. They may be blended during the graft-modifying stage or after the modification.

Other Resin Component (B)

The crosslinked product or the crosslinked foamed product of the present invention is formed from the above mentioned ethylene copolymer (A) or a resin composition containing the ethylene copolymer (A). The crosslinked product or the crosslinked foamed product is not particularly limited as long as it contains the ethylene copolymer (A) as an essential component, and it may be formed from a resin composition containing other resin component (B) other than the ethylene copolymer (A). Examples of the other resin component (B) include α-olefin-polar monomer copolymers, ethylene-α-olefin-non-conjugated polyene copolymers and various types of olefinic polymers.

When the crosslinked product or the crosslinked foamed product of the present invention contains the other resin component (B) other than the ethylene copolymer (A), the other resin component (B) is preferably an ethylene-polar monomer copolymer (B1).

Examples of the polar monomer of the ethylene-polar monomer copolymer (B1) include unsaturated carboxylic acids and salts thereof, esters thereof, amides thereof, vinyl esters and carbon monoxide. More specific examples thereof include unsaturated carboxylic acids such as acrylic acid, methacrylic acid, fumaric acid, itaconic acid, monomethyl maleate, monoethyl maleate, maleic anhydride and itaconic anhydride; salts of these unsaturated carboxylic acids, that is, salts of monovalent metals such as lithium, sodium, and potassium and salts of polyvalent metals such as magnesium, calcium, and zinc; unsaturated carboxylic acid esters such as methyl acrylate, ethyl acrylate, isopropyl acrylate, isobutyl acrylate, n-butyl acrylate, isooctyl acrylate, methyl methacrylate, ethyl methacrylate, isobutyl methacrylate, and dimethyl maleate; vinyl esters such as vinyl acetate and vinyl propionate; carbon monoxide; sulfur dioxide; and the like. One or two or more of the above can be used.

More specifically, representative examples of the ethylene-polar monomer copolymer (B1) include ethylene-unsaturated carboxylic acid copolymers such as ethylene-acrylic acid copolymer and ethylene-methacrylic acid copolymer; ionomers in which a part or the whole of the carboxyl group of the above ethylene-unsaturated carboxylic acid copolymer is neutralized by the above metal; ethylene-unsaturated carboxylic acid ester copolymers such as ethylene-methyl acrylate copolymer, ethylene-ethyl acrylate copolymer, ethylene-methyl methacrylate copolymer, ethylene-isobutyl acrylate copolymer and ethylene-n-butyl acrylate copolymer; ethylene-unsaturated carboxylic acid ester-unsaturated carboxylic acid copolymers such as ethylene-isobutyl acrylate-methacrylic acid copolymer and ethylene-n-butyl acrylate-methacrylic acid copolymer; and ionomers thereof in which a part or the whole of the carboxyl group is neutralized by the above metal; and ethylene-vinyl ester copolymers such as ethylene-vinyl acetate copolymer; and the like.

Among these, particularly a copolymer of ethylene and a polar monomer selected from unsaturated carboxylic acids, salts thereof, esters thereof, and vinyl acetate is preferred. In particular, an ethylene-(meth)acrylic acid copolymer or an ionomer thereof, an ethylene-(meth)acrylic acid-(meth)acrylate ester copolymer or an ionomer thereof, or an ethylene-vinyl acetate copolymer is preferred, and an ethylene-vinyl acetate copolymer is most preferred.

As the ethylene-polar monomer copolymer (B1), preferred is a copolymer having a polar monomer content of usually from 1 to 50% by mass, in particular from 5 to 45% by mass, although the content varies depending on the type of the polar monomer. In view of the molding processability, mechanical strength and the like, the ethylene-polar monomer copolymer having a $MFR_{2.16}$ of from 0.05 to 500 g/10 min, in particular from 0.1 to 100 g/10 min is preferably used. The copolymers of ethylene with unsaturated carboxylic acids, unsaturated carboxylic acid esters, vinyl esters or the like can be obtained by radical copolymerization under the conditions of high temperature and high pressure. In addition, the copolymers (ionomers) of ethylene with metal salts of unsaturated carboxylic acids can be obtained by reacting ethylene-unsaturated carboxylic acid copolymers with the corresponding metal compounds.

In the present invention, if the ethylene-polar monomer copolymer (B1) used as the other resin component (B) is an ethylene-vinyl acetate copolymer, the vinyl acetate content of the ethylene-vinyl acetate copolymer is usually from 10 to 30% by mass, preferably from 15 to 30% by mass, and more preferably from 15 to 25% by mass. Further, this ethylene-vinyl acetate copolymer has a $MFR_{2.16}$ of usually from 0.1 to 50 g/10 min, preferably from 0.5 to 20 g/10 min, and more preferably from 0.5 to 5 g/10 min.

If the crosslinked product or the crosslinked foamed product of the present invention is formed using a resin composition containing the ethylene copolymer (A) and the ethylene-polar monomer copolymer (B1), the resin composition contains the above ethylene copolymer (A) in a proportion of from 100 to 20 parts by mass, and contains the ethylene-polar monomer copolymer (B1) in a proportion of from 0 to 80 parts by mass of (B1). In one of the preferred embodiments, the resin composition contains 100 parts by mass of the ethylene copolymer (A) and no (B1). When the resin composition contains (B1), it is preferred that (A) is contained in a proportion of from 99 to 20 parts by mass, and (B1) is contained in a proportion of from 1 to 80 parts by mass (as used herein, the total amount of (A) and (B1) is defined as 100 parts by mass). In other words, in the resin composition according to the present invention, the mass ratio ((A)/(B1)) of the ethylene copolymer (A) to the ethylene-polar monomer copolymer (B1) is from 100:0 to 20:80, and in one of the preferred embodiments, the mass ratio is 100:0. When the resin composition contains (B1), the mass ratio ((A)/(B1)) is preferably in the range of from 99:1 to 20:80 and more preferably from 99:1 to 40:60.

When the resin composition according to the present invention contains the other resin component (B) in addition to the ethylene copolymer (A), the other resin component (B) preferably contains the ethylene-polar monomer copolymer (B1), but it may contain another resin component if necessary. The other resin component is not particularly limited, and examples thereof include an ethylene-α-olefin-non-conjugated polyene copolymer and the like. When the resin composition according to the present invention contains a resin component other than the ethylene copolymer (A) and the ethylene-polar monomer copolymer (B1), the content thereof is usually 30 parts by mass or less, preferably approximately from 1 to 20 parts by mass, based on 100 parts by mass of the total (A) and (B1).

Crosslinking Agent (C)

The crosslinked product or the crosslinked foamed product of the present invention may be formed from a resin composition containing a crosslinking agent (C) as required.

As the crosslinking agent (C), any radical generator which acts as a crosslinking agent can be used without particular limitations.

When the resin composition used for forming the crosslinked product or the crosslinked foamed product of the present invention contains the crosslinking agent (C), its content is preferably in the range of from 0.1 to 2.0 parts by mass, more preferably from 0.3 to 1.8 parts by mass, and still more preferably from 0.6 to 1.6 parts by mass, based on 100 parts by mass of the total amount of the ethylene copolymer (A) and the other resin component (B) such as the ethylene-polar monomer copolymer (B1) (i.e., 100 parts by mass of the total resin components). If the resin composition containing the crosslinking agent (C) in such an amount is used, a molded article or a foamed molded article having an appropriate crosslinked structure can be obtained.

As the crosslinking agent (C), an organic peroxide is preferably used. Specific examples thereof include organic peroxides such as dicumyl peroxide, di-t-butyl peroxide, 2,5-dimethyl-2,5-di-(t-butylperoxy)hexane, 2,5-dimethyl-2,5-di-(t-butylperoxy)hexine-3, 1,3-bis(t-butylperoxyisopropyl)benzene, 1, 1-bis(t-butylperoxy)-3, 3, 5-trimethylcyclohexane, n-butyl-4,4-bis(t-butylperoxy)varelate, benzoyl peroxide, p-chlorobenzoyl peroxide, 2,4-dichlorobenzoyl peroxide, t-butylperoxy benzoate, t-butyl perbenzoate, t-butylperoxyisopropyl carbonate, diacetyl peroxide, lauroyl peroxide, and t-butylcumyl peroxide. Among these, dicumyl peroxide is preferred.

When the resin composition according to the present invention contains the crosslinking agent (C), the resin composition preferably contains an auxiliary crosslinking agent as required, along with the crosslinking agent (C). Examples of the auxiliary crosslinking agent include peroxy auxiliary crosslinking agents such as sulfur, p-quinonedioxime, p,p'-dibenzoylquinoneoxime, N-methyl-N-4-dinitrosoaniline, nitrosobenzene, diphenylguanidine, and trimethylolpropane-N,N'-m-phenylenedimaleimide; and divinylbenzene, triallylcyanurate (TAC) and triallylisocyanurate (TAIC).

Examples of the auxiliary crosslinking agent also include multifunctional methacrylate monomers such as ethylene glycol dimethacrylate, diethylene glycol dimethacrylate, polyethylene glycol dimethacrylate, trimethylolpropane trimethacrylate, and allyl methacrylate; multifunctional vinyl monomers such as vinyl butyrate, and vinyl stearate; and the like. Among these, triallylcyanurate (TAC) and triallylisocyanurate (TAIC) are preferred.

In the resin composition according to the present invention, it is desirable that such an auxiliary crosslinking agent be used in an amount such that the mass ratio of the auxiliary crosslinking agent to the crosslinking agent (C) [auxiliary crosslinking agent/crosslinking agent (C)] is from 1:30 to 5:1, preferably from 1:20 to 3:1, more preferably from 1:15 to 2:1, and particularly preferably from 1:10 to 1:1.

Foaming Agent (D)

The crosslinked product or the crosslinked foamed product of the present invention, particularly the crosslinked foamed product, may be formed from the resin composition containing the crosslinking agent (C).

When the resin composition contains the foaming agent (D), its content varies depending on the type of the foaming agent (D) used. However, it is desirable that the content of the foaming agent (D) be in the range of from 0.1 to 30 parts by mass, preferably from 0.1 to 25 parts by mass, and more preferably from 0.5 to 20 parts by mass, based on 100 parts by mass of the total amount of the ethylene copolymer (A) and the other resin component (B) such as the ethylene-polar monomer copolymer (B1) (i.e., 100 parts by mass of the total resin components).

In the present invention, a chemical foaming agent or a physical foaming agent can be used as the foaming agent (D).

Specific examples of the chemical foaming agent include azo compounds such as azodicarbonamide (ADCA), 1,1'-azobis(1-acetoxy-1-phenylethane), dimethyl-2,2'-azobisbutylate, dimethyl-2,2'-azobisisobutylate, 2,2'-azobis(2,4,4-trimethylpentane), 1,1'-azobis(cyclohexane-1-carbonitrile), and 2,2'-azobis[N-(2-carboxyethyl)-2-methyl-propioneamidine]; nitroso compounds such as N,N'-dinitrosopentamethylenetetramine (DPT); hydrazine derivatives such as 4,4'-oxybis(benzene-sulfonylhydrazide) and diphenylsulfone-3,3'-disulfonylhydrazide; semicarbazide compounds such as p-toluenesulfonyl semicarbazide; organic thermally decomposable foaming agents such as trihydrazinotriazine; bicarbonates such as sodium hydrogen carbonate and ammonium hydrogen carbonate; carbonates such as sodium carbonate and ammonium carbonate; nitrites such as ammonium nitrite; and inorganic thermally decomposable foaming agents such as a hydrogen compound. Among these, azodicarbonamide (ADCA) and sodium hydrogen carbonate are particularly preferred.

Further, examples of the physical foaming agent, which is a foaming agent not necessarily accompanied by chemical reactions upon foaming, include organic physical foaming agents including various kinds of aliphatic hydrocarbons such as methanol, ethanol, propane, butane, pentane, and hexane; various kinds of chlorinated hydrocarbons such as dichloroethane, dichloromethane, and carbon tetrachloride; various kinds of fluorochlorohydrocarbons such as chlorofluorocarbon; and inorganic physical foaming agents such as air, carbon dioxide, nitrogen, argon, and water; and the like. Among these, carbon dioxide, nitrogen and argon are the most excellent because they do not need to be turned into vapor, and is inexpensive and most unlikely to cause environmental pollution and ignition.

If the physical foaming agent is used as the foaming agent (D) in the present invention, no decomposition residue of the foaming agent is left, thereby preventing the fouling of the mold during the crosslinking forming process of the composition. Moreover, the physical foaming agent is excellent in kneadability, since it is not in a powder form. In addition, the use of the physical foaming agent allows for preventing the foul odor of the resulting foamed product (such as an ammonia odor generated upon decomposition of ADCA).

Further, in the present invention, the chemical foaming agent as described above may be used as the foaming agent (D) as long as it causes no adverse effect such as odor and mold fouling. The chemical foaming agent may be used alone or in combination with two or more kinds. A physical foaming agent and a chemical foaming agent may be used in combination.

In the case of small-scale production, the physical foaming agent such as carbon dioxide or nitrogen can be stored in a gas cylinder, and it may be supplied to an injection molding machine, extrusion molding machine and the like through a pressure reducing valve, or it may be pressurized by a pump or the like and then supplied to an injection molding machine, extrusion molding machine and the like.

In the case of large-scale production in a facility therefor, liquefied carbon dioxide, liquefied nitrogen and the like stored in a storage tank is vaporized by passing through a heat exchanger and supplied to an injection molding machine, an extrusion molding machine and the like through piping and a pressure reducing valve.

When a physical foaming agent in a liquid state is used, the storage pressure is preferably in the range of from 0.13 to 100 M Pa.

If a chemical foaming agent is used as the foaming agent (D), the chemical foaming agent is used in a proportion of from 2 to 30 parts by mass, preferably from 3 to 20 parts by mass, and more preferably from 5 to 15 parts by mass, based on 100 parts by mass of the total amount of the ethylene copolymer (A) and the other resin component (B) such as the ethylene-polar monomer copolymer (B1). However, the amount of the chemical foaming agent may be increased or decreased as appropriate based on the intended expansion ratio, since the volume of the gas generated varies depending on the type and grade of the foaming agent used.

If a physical foaming agent is used as the foaming agent (D), the amount of the physical foaming agent to be added is determined as appropriate based on the desired expansion ratio, and it is usually from 0.1 to 15 parts by mass, and preferably from 0.5 to 10 parts by mass, based on 100 parts by mass of the total amount of the ethylene copolymer (A) and the other resin component (B) such as the ethylene-polar monomer copolymer (B1).

The resin composition according to the present invention may contain an auxiliary foaming agent if necessary, along with the foaming agent (D). The auxiliary foaming agent has functions of lowering the decomposition temperature of the foaming agent (D), accelerating the decomposition, making bubbles uniform, and the like. Examples of such an auxiliary foaming agent include zinc oxide (ZnO), zinc stearate; organic acids such as salicylic acid, phthalic acid, stearic acid and oxalic acid; and urea and derivatives thereof; and the like.

Optional Component

The resin composition according to the present invention may contain components other than the various components mentioned above as optional components, as required. For example, the resin composition may contain various kinds of additives such as fillers, heat stabilizers, weathering stabilizers, flame retardants, hydrochloric acid absorbents, and pigments. Examples of the various kinds of additives include known additives which can be added to an olefinic resin.

In the present invention, the ethylene copolymer (A) or a resin composition containing the ethylene copolymer (A) can be used in various molding applications such as injection molding and foaming molding, and it can be suitably used in the production of a crosslinked product or a crosslinked foamed product.

Production of Crosslinked Product and Crosslinked Foamed Product

In the present invention, the above mentioned ethylene copolymer (A) or a resin composition containing the ethylene copolymer (A) is used as a material containing the ethylene copolymer (A) to produce a crosslinked product or a crosslinked foamed product through a step of melt molding, a step of crosslinking, and a step of foaming which is performed as required.

The step of melt molding, the step of crosslinking, and the step of foaming which is performed as required, may be carried out sequentially or continuously, or may be carried out simultaneously.

In the production of a crosslinked product or crosslinked foamed product, the resin composition may be prepared in advance, for example, as pellets or in a melt kneaded state. Alternatively, when carrying out the melt molding step, each component of the resin composition may be supplied to the same feed zone simultaneously or sequentially, or may be separately supplied from separate feed ports simultaneously or sequentially, so that the composition is prepared in the molding machine simultaneously while carrying out the melt molding step. In cases where the resin composition prepared in advance is not used, each component of the resin composition may be separately supplied to the same or separate feed zone, or a composition composed of arbitrary two or more components of all the components may be supplied.

In the present invention, the step of melt molding is not particularly limited as long as it includes a stage in which a material containing the ethylene copolymer (A) is melted and molded, and conventionally known melt molding methods such as extrusion molding, rotation molding, calender molding, injection molding, compression molding, transfer molding, powder molding, blow molding, and vacuum molding can be used to produce molded articles in various shapes. Further, the molding step may be carried out using a material containing the ethylene copolymer (A) formed into a sheet or tube, by methods such as calender molding, press molding, extrusion molding, and inflation molding. Among these molding methods, injection molding and transfer molding are preferred, and injection molding is particularly preferred. The injection molding or transfer molding is preferred, because it provides an excellent efficiency in the production of the crosslinked product or the crosslinked foamed product. The ethylene copolymer (A) according to the present invention or a resin composition containing the ethylene copolymer (A) is excellent in injection moldability, and when used for producing an injection molded article or injection foamed molded article, a molded article having a good moldability and an excellent dimensional accuracy can be provided.

Further, the step of crosslinking, and the step of foaming which is performed as required, may be carried out simultaneously with the step of melt molding, or may be carried out after the step of melt molding. The step of crosslinking and the step of foaming which is performed as required may be carried out after a molded article is obtained, cooled once, and then heated again. The step of crosslinking may be crosslinking using the above mentioned crosslinking agent (C), or crosslinking using an electron beam and the like.

When producing a crosslinked foamed product, the production method usually includes a step of melt molding a material containing the ethylene copolymer (A), a step of carrying out crosslinking, and a step of carrying out foaming. The method for producing the crosslinked foamed product of the present invention includes a step of melt molding the above mentioned ethylene copolymer (A) or a resin composition containing the ethylene copolymer (A), a step of carrying out crosslinking, and a step of carrying out foaming.

The resin composition used for producing a crosslinked foamed product is in a non-crosslinked and unfoamed state, and it may be in a melted state, or in the form of pellets or a sheet which is cooled and solidified.

For example, when the crosslinked foamed product is produced using pellets of the resin composition containing the ethylene copolymer (A), the pellets can be prepared by: mixing each of the components such as the ethylene copolymer (A), and the other resin component (B) such as the ethylene-polar monomer copolymer (B1) as required, and the crosslinking agent (C), the foaming agent (D) and other additives as required, in the above mentioned ratio using a Henschel mixer or the like; melt-plasticizing the mixture using a kneader such as a Banbury mixer, a roll, an extruder or the like at a temperature at which the crosslinking agent (C) and/or the foaming agent (D) are not decomposed; homogeneously mixing and dispersing the resultant; and pelletizing using a granulator.

Examples of the method for producing a crosslinked foamed product include crosslinking by heat treatment and ionizing radiation crosslinking as described later. In the case of crosslinking by heat treatment, the resin composition preferably contains the crosslinking agent (C) and an auxiliary crosslinking agent. In the case of ionizing radiation, the resin composition preferably contains an auxiliary crosslinking agent.

The crosslinked foamed product according to the present invention may contain various types of additives such as fillers, heat stabilizers, weathering stabilizers, flame retardants, hydrochloric acid absorbents and pigments as required, to the extent that the object of the present invention is not impaired. These additives may be contained in the resin composition in advance, or may be added during the production process of the crosslinking foamed product.

When the crosslinked foamed product is produced using a sheet of the ethylene copolymer (A) or a resin composition containing the ethylene copolymer (A), the sheet can be prepared, for example, by feeding the pellets obtained as mentioned above to an extruder or a calender molding machine. Further, a foamable sheet in a non-crosslinked and unfoamed state can be prepared by a method in which each of the components constituting the resin composition is kneaded by a Brabender or the like, and then molded into a sheet by a calender roll, or by a method in which pellets are kneaded using an extruder and then formed into a sheet by passing through a T-die or a cyclic die.

Specifically, the crosslinked foamed product of the present invention can be prepared by the following method, for example.

When the crosslinked foamed product is produced using the above mentioned sheet of the resin composition, for example, the sheet of the resin composition obtained as described above can be molded using a calender molding machine, a press molding machine, or a T-die extruder. Preferably, the sheet of the resin composition can be obtained using a calender molding machine, a press molding machine, or a T-die extruder. In the molding of the sheet, if the resin composition contains the crosslinking agent (C) and the foaming agent (D), the sheet is preferably molded at a temperature equal to or lower than the decomposition temperature of the crosslinking agent (C) and the foaming agent (D). Specifically, the sheet is preferably molded under the conditions set such that the temperature of the resin components constituting the resin composition in a melted state is from 100 to 130° C., for example.

An exemplary method for producing a primary foamed product from the sheet obtained by the above method is as follows. To a mold maintained at a temperature of from 130 to 200° C., the sheet cut into a volume of from 1.0 to 1.2 times the volume of the mold is placed, and a primary foamed product (non-crosslinked or crosslinked foamed product) is prepared under the conditions of a clamping pressure of, for example, from 30 to 300 kgf/cm$^2$, and a holding time of, for example, from 10 to 90 min.

In other words, a foamed molded article (non-crosslinked or crosslinked foamed product) is produced by heat treatment. If the foamed molded article is non-crosslinked, crosslinking can be further performed by heating, electron beam irradiation or the like to produce a crosslinked foamed product. The holding time is increased or decreased as appropriate without being limited by the above described range, because it varies depending on the thickness of the mold.

The shape of the mold used for producing the above mentioned (crosslinked) foamed product is not particularly limited, but a mold having a shape suitable for producing sheets is usually used. The mold preferably has a completely closed structure so that the melted resin and the gas generated during the decomposition of the foaming agent may not escape. Further, the mold form preferably has a tapered inner surface, from the viewpoint of the releasability of the resin.

In addition to the method described above, the non-crosslinked foamed molded article or the crosslinked foamed product of the present invention can also be produced, for example, by an extrusion foaming method in which the resin composition containing the ethylene copolymer (A) is extruded from an extruder, and subjected to foaming as soon as the composition is released into the atmosphere. In other words, a foamed product can be produced by heat treatment. If the foamed molded article is non-crosslinked, crosslinking can be further performed by heating, electron beam irradiation or the like to produce a crosslinked foamed product.

Further, there may be mentioned a method (injection foaming method) in which the ethylene copolymer (A) or a resin composition containing the ethylene copolymer (A), preferably the resin composition containing the crosslinking agent (C) and the foaming agent (D), is injected into a mold at a temperature equal to or lower than the decomposition temperature of the crosslinking agent (C) and the foaming agent (D), and maintained in the mold at a temperature of, for example, approximately from 130° C. to 200° C. to allow the crosslinking foaming. In other words, a foamed product can be produced by heat treatment. If the foamed molded article is non-crosslinked, crosslinking can be further performed by heating, electron beam irradiation or the like to produce a crosslinked foamed product.

It is also preferred that a predetermined shape be given to the primary foamed product obtained by the above method, by compression molding. An example of the compression molding conditions at this time is as follows: the mold temperature is in the range of from 130 to 200° C., the clamping pressure is in the range of from 30 to 300 kgf/cm$^2$, the compression time is in the range of from 5 to 60 minutes, and the compression ratio is in the range of from 1.1 to 3.0 and preferably 1.3 to 2.

Further, in order to obtain a crosslinked foamed product by ionizing radiation crosslinking, if the foamed molded article is non-crosslinked, crosslinking is further performed by heating, electron beam irradiation or the like to produce a crosslinked foamed product. The resin composition containing the foaming agent (D), which is preferably an organic thermally decomposable foaming agent, is kneaded at a temperature less than the decomposition temperature of the foaming agent (D), and the resulting kneaded product is molded into a form of sheet to obtain a non-crosslinked foamable sheet.

Then the resulting non-crosslinked foamable sheet is irradiated with a predetermined dose of ionizing radiation to allow crosslinking, and the resulting crosslinked foamable sheet is further heated, as required, to a temperature equal to or higher than the decomposition temperature of the organic thermally decomposable foaming agent to allow foaming, to obtain a crosslinked foamed product in a form of sheet. In other words, a foamed product can be produced by heat treatment.

As the ionizing radiation, an α-ray, β-ray, γ-ray, electron beam, neutron beam, X-ray or the like is used. Among these, the γ-ray of cobalt-60 or the electron beam is preferably used.

Examples of the shape of the crosslinked foamed product include a sheet shape, a thick board shape, a net shape, a molded shape and the like.

A secondary foamed product can be produced by imparting a predetermined shape to the crosslinked foamed product obtained as described above by compression molding. An example of the compression molding conditions at this time is as follows: the mold temperature is in the range of from 130 to 200° C., the clamping pressure is in the range of from 30 to 300 kgf/cm$^2$, the compression time is in the range of from 5 to 60 minutes, and the compression ratio is in the range of from 1.1 to 3.0.

Among the above mentioned production methods, it is preferred that the crosslinked foamed product be obtained by the heat treatment of the ethylene copolymer (A) or a resin composition containing the ethylene copolymer (A), preferably the resin composition containing the crosslinking agent (C) and the foaming agent (D).

The crosslinked foamed product of the present invention preferably has a specific gravity of from 0.03 to 0.30. Further, in terms of being able to provide a foamed molded article which is light weight and has a small compression set, it is preferred that the compression set (CS, %) and the specific gravity (d) of the foamed molded article of the present invention satisfy the condition: CS≤−279×(d)+95, but not particularly limited thereto. Since such a foamed molded article has a good stress relaxation for compression and is suitable for an application requiring sag resistance, it is preferably used for the laminated product, footwear or footwear parts which will be described later. The lower limit of the CS value is not particularly limited, and in one of the preferred embodiments, the CS value is, for example, 10% or more and preferably 25% or more.

The method for producing a crosslinked product of the present invention is capable of producing a crosslinked product having a good moldability and excellent mechanical properties.

In the method for producing a crosslinked product of the present invention, the good moldability is considered to result from a high MFR$_{10}$/MFR$_{2.16}$ ratio of the ethylene copolymer (A) used as the material. Further, the rubber elasticity is secured by crosslinking. In the method for producing a crosslinked product of the present invention and in the crosslinked product according to the present invention, even in cases where the degree of the crosslinking is the same, high mechanical strength is obtained due to using the ethylene copolymer (A) having a high vinyl group content as the material. In order to obtain a crosslinked product excellent in mechanical strength, it is particularly preferred that the ethylene copolymer (A) obtained by using ethylene and an α-olefin alone as monomers be used. The reason for this is not known, but it is considered as follows. When an ethylene copolymer having a low vinyl group content is used, and the amount of the crosslinking agent is increased, for example, in order to achieve a certain degree of crosslinking, there are cases where the crosslinking points may not be distributed uniformly; whereas when the ethylene copolymer (A) having a high vinyl group content is used as in the present invention, the crosslinking points are uniformly distributed to achieve a certain degree of crosslinking. Further, it is also considered that when the ethylene copolymer (A) is one obtained by copolymerizing ethylene and an α-olefin alone, vinyl groups exist at the end of the molecules, resulting in a more uniform distribution of the crosslinking points. For example, when the ethylene copolymer (A) of the present invention and a polymer having a lower vinyl group content are compared, with their degree of crosslinking (such as the gel content; or in the case of the foamed product, the specific gravity and the compression set) set to the same level, the ethylene copolymer (A) of the present invention is considered to have a better mechanical strength (such as elongation). In addition, according to the method for producing a crosslinked product of the present invention, the obtained crosslinked product is less likely to have a poor appearance (surface roughness due to discoloration, occurrence of bubbles and the like).

The method for producing a crosslinked foamed product of the present invention is capable of providing a crosslinked product having a good productivity such as excellent dimensional stability, and excellent mechanical properties. The reason for this is considered as follows. Upon injection molding, for example, generation of heat when the resin is injected into a mold through an injection zone (such as a gate or nozzle) can be prevented, thereby preventing unexpected foaming or crosslinking outside the mold.

Further, the crosslinked foamed product of the present invention is excellent in mechanical strength. In the production of a crosslinked foamed product, rubber elasticity and the like is secured by crosslinking. When the ethylene copolymer (A) of the present invention is used, it is considered that the mechanical strength of the obtained crosslinked foamed product is increased due to a high vinyl group content in the copolymer, even though the degree of the crosslinking is the same. In particular, it is considered that the use of the ethylene copolymer (A) obtained by using ethylene and an α-olefin alone as monomers is preferred. The reason for this is not known, but as mentioned above, it is considered as follows. When an ethylene copolymer having a low vinyl group content is used, and the amount of the crosslinking agent is increased, for example, in order to achieve a certain degree of crosslinking, there are cases where the crosslinking points may not be distributed uniformly; whereas when the ethylene copolymer (A) having a high vinyl group content is used as in the present invention, the crosslinking points are uniformly distributed to achieve a certain degree of crosslinking. Further, it is also considered that when the ethylene copolymer (A) is one obtained by copolymerizing ethylene and an α-olefin alone, vinyl groups exist at the end of the molecules, resulting in a more uniform distribution of the crosslinking points. For example, when the ethylene copolymer (A) of the present invention and a polymer having a lower vinyl group content are compared, with their degree of crosslinking (such as the gel content; or in the case of the foamed product, the specific gravity and the compression set) set to the same level, the ethylene copolymer (A) of the present invention is considered to have a better mechanical strength (such as elongation).

In addition, according to the method for producing the cross linked foamed product of the present invention, the obtained foamed product is less likely to have a poor appearance (surface roughness due to discoloration, unexpected occurrence of bubbles and the like).

Application of Crosslinked Product

The crosslinked product according to the present invention can be suitably used in automotive weather strips, construction materials, hoses (automotive hoses, water supply hoses, and gas hoses), anti-vibration rubber (automotive anti-vibration rubber, railway anti-vibration rubber, anti-vibration rubber for industrial machines, and seismic isolation rubber for construction), belts (transmission belts and conveyor belts), sealing materials (cups/sealing materials for automobiles, and sealing materials for industrial machines), covered electric wires, electric wire joints, electrical insulating parts, semiconductive rubber parts, rolls for office automation equipment, industrial rolls, rubber products for household use and the like.

Further, the crosslinked product according to the present invention can be suitably used in automotive interior materials, low VOC automotive materials, electronic parts, hard disk covers, electromagnetic wave shields, heat radiating materials, transparent hoses, watch bands, semiconductor sealing materials, solar cell sealing materials, low VOC construction materials, construction gaskets, construction sheets, construction joint fillers, and the like.

Examples of the automotive weather strips include door weather strips, trunk weather strips, luggage weather strips, roof side rail weather strips, sliding door weather strips, ventilator weather strips, sliding loop panel weather strips, front window weather strips, rear window weather strips, quarter window weather strips, lock pillar weather strips, door glass outer weather strips, door glass inner weather strips, dam windshields, glass run channels, door mirror brackets, seal head lamps, seal cowl tops, and the like.

Examples of the automotive hoses include brake hoses, radiator hoses, heater hoses, air cleaner hoses, and the like.

Examples of the automotive anti-vibration rubber include engine mounts, liquid sealed engine mounts, damper pulleys, chain dampers, carburetor mounts, torsional dampers, strut mounts, rubber bushes, bumper rubber, helper rubber, spring sheets, shock absorbers, air springs, body mounts, bumper guards, muffler supports, rubber couplings, center bearing supports, clutch rubber, differential mounts, suspension bushes, slide bushes, cushion strut bars, stoppers, handle dampers, radiator supporters, muffler hangers, and the like.

Examples of the railway anti-vibration rubber include slab-mats, ballast mats, track mats and the like.

Examples of the anti-vibration rubber for industrial machines include expansion joints, flexible joints, bushes, mounts, and the like.

Examples of the transmission belts include V-belts, flat belts, toothed belts, and the like.

Examples of the conveyor belts include light conveyor belts, cylindrical belts, rough top belts, flanged conveyor belts, U-type guided conveyor belts, V guided conveyor belts, and the like.

Examples of the cups/sealing materials for automobiles include master cylinder piston cups, wheel cylinder piston cups, constant velocity joints, pin boots, dust covers, piston seals, packings, O-rings, diaphragms, and the like.

Examples of the sealing materials for industrial machines include condenser packings, O-rings, packings, and the like.

Examples of the automotive weather strip sponges include door weather strip sponges, bonnet weather strip sponges, trunk room weather strip sponges, sunroof weather strip sponges, ventilator weather strip sponges, corner sponges, and the like.

Examples of the sealing sponges for construction include gaskets, air-tight sponges, joint fillers and sealing sponges for door stop portion.

Examples of the rolls for office automation equipment include electrically charged rolls, transfer rolls, developing rolls, paper feed rolls, and the like.

Examples of the industrial rolls include iron manufacturing rolls, paper manufacturing rolls, printing electric wire rolls, and the like.

Examples of the rubber products for household use include rain gear, rubber bands, shoes, rubber gloves, latex products, golf balls and the like.

<Laminated Molded Article and Footwear Parts>

It is also preferred that the crosslinked product of the present invention be a laminated molded article composed of the crosslinked product of the present invention and other materials laminated together, or composed of more than one crosslinked products laminated together. In particular, the crosslinked product to be formed into a laminated molded article is preferably a crosslinked foamed product. The crosslinked foamed product of the present invention which is a laminated product, is preferably a laminated molded article comprising a layer composed of the above mentioned crosslinked foamed molded article of the present invention and a layer composed of at least one type of raw material selected from the group consisting of polyolefin, polyurethane, rubber, leather and artificial leather.

As the other raw material constituting the laminated molded article, which is preferably at least one type of raw material selected from the group consisting of polyolefin, polyurethane, rubber, leather and artificial leather, a known material can be used without any particular limitation. Such a laminated molded article is particularly suitable for footwear parts.

Examples of the footwear parts include shoe soles, midsoles, innersoles, soles, sandals and the like.

Since the footwear or the footwear part according to the present invention is formed from the foamed molded article of the present invention which is the foamed molded article or the laminated product of the present invention, it is lightweight, and the deformation thereof due to long-term use can be prevented. Therefore, the crosslinked foamed molded article of the present invention which is a footwear part is particularly useful for use in sports shoes.

EXAMPLES

Hereinafter, the present invention will be described in more specific detail with reference to Examples, but it should be noted that the present invention is in no way limited to these Examples.

In the following Examples and Comparative Examples, various physical properties were measured or evaluated in the following manners.

[Physical Properties Evaluation of the Copolymer]

Amount of Double Bonds

The determination of the amount of double bonds was carried out by $^1$H-NMR measurement ("ECX400P nuclear magnetic resonance spectrometer"; manufactured by JEOL Ltd.) of the ethylene α-olefin copolymer. Here, vinyl-type double bonds, vinylidene-type double bonds, 2-substituted olefin-type double bonds and 3-substituted olefin-type double bonds are observed as signals of double bonds. The amount of double bonds was determined by the integrated intensity of each of the signals. The signal of methylene in the main chain of the ethylene•α-olefin copolymer was used as the chemical shift reference (1.2 ppm).

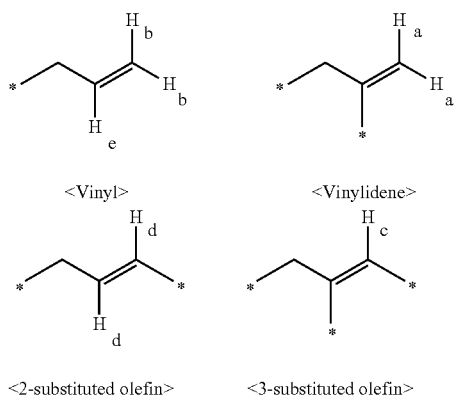

In each of the above formulae, * represents a bond to an atom other than hydrogen atom.

The peak of each of the hydrogen atoms a to e is observed in the vicinity of the following.

The peak of the hydrogen atom a: 4.60 ppm
The peak of the hydrogen atom b: 4.85 ppm
The peak of the hydrogen atom c: 5.10 ppm
The peak of the hydrogen atom d: 5.25 ppm
The peak of the hydrogen atom e: 5.70 ppm The equation for determining the amount of double bonds is as follows.

The amount of vinyl-type double bonds={(the integrated intensity of signal $b$)+(the integrated intensity of signal $e$)}/3

The amount of vinylidene-type double bonds=(the integrated intensity of signal $a$)/2

The amount of 2-substituted olefin-type double bonds=(the integrated intensity of signal $d$)/2

The amount of 3-substituted olefin-type double bonds=(the integrated intensity of signal $c$)

The vinyl group content (the amount of the vinyl-type double bonds) per 1,000 carbon atoms and the vinylidene group content (the amount of the vinylidene-type double bonds) per 1,000 carbon atoms were determined from these results.

Density d

The density d (kg/m$^3$) was determined at a temperature of 23° C. in accordance with ASTM D1505.

MFR

The MFR (melt flow rate, g/10 minutes) was determined at a temperature of 190° C. in accordance with ASTM D1238. The value measured at a load of 2.16 kg is defined as MFR$_{2.16}$, and the value measured at a load of 10 kg is defined as MFR$_{10}$.

Molecular Weight Distribution (Mw/Mn)

The molecular weight distribution (Mw/Mn) was determined by gel permeation chromatography (GPC) at 140° C. using o-dichlorobenzene as the solvent. The measurement was made in the following manners, using Gel Permeation Chromatography Alliance GPC-2000 Model manufactured by Waters Corporation. Two columns of TSK gel GNH6-HT and two columns of TSK gel GNH6-HTL (each 7.5 mm in diameter and 300 mm in length) were used, and the column temperature was set at 140° C. As the mobile phase, o-dichlorobenzene (Wako Pure Chemical Industries, Ltd.) containing 0.025% by mass of BHT (Takeda Pharmaceutical Company Limited) as an antioxidant was used. The flow rate was 1.0 mL/min, the sample concentration was 15 mg/10 mL, the sample injection volume was 500 μL, and a differential refractometer was used as a detector. Standard polystyrenes manufactured by Toso Corporation, Ltd. were used for Mw<1,000 and Mw>4×10$^6$ and those manufactured by Pressure Chemical Company were used for 1,000≤Mw≤4×10$^6$.

[Physical Properties/Appearance Evaluation of Cross Linked Sheet]

Tensile Strength

The tensile strength was obtained by performing a tensile test at a tensile speed of 50 mm/min, using a JIS #3 dumbbell.

Gel Content

The gel content was obtained as follows. A quantity of 2 g of the crosslinked product was collected, placed in a wire netting of 325 mesh, immersed in a boiling paraxylene solvent at 140° C. for 24 hours, and the residue was dried at 23° C. for 1 hour, followed by further vacuum drying at 80° C. for 2 hours and the weight of the gel product remained in the wire netting was measured to obtain the gel content.

Surface Condition

The surface condition of the crosslinked sheet were evaluated visually, and those having a smooth surface and no roughness were evaluated as "good", and those having a rough surface were evaluated as "poor".

[Physical Properties Evaluation of Crosslinked Foamed Product]

Specific Gravity

The specific gravity was measured in accordance with JIS K7222. If the foamed product is a cube, sampling was performed at the site which was 20 mm or more inside from each of the four sides of a flat surface having the maximum area, and at the surface of the parallel flat surface, with skin layers remaining unremoved. If the foamed product is a midsole, for example, samples were obtained from the both surfaces of the roughly parallel flat surfaces of the midsole with skin layers remaining unremoved, at the site 20 mm or more inside from each of the ends of the sole.

The average value of the measurements at five sites is taken as the specific gravity of the foamed product. In addition, the difference between the maximum and the minimum measured values of the specific gravity at the five sites, which is a measure of the uniformity of the quality of the foamed product, is preferably 0.08 or less and more preferably 0.06 or less. If the difference is greater than 0.08, it means that the quality of the molded product (such as hardness, mechanical properties, and compression set) is not uniform.

Asker C Hardness

The Asker C hardness was measured under an environment of 23° C. in accordance with the "Spring Hardness Test Type C Test Method" described in JIS K7312-1996 Annex 2.

Rebound Resilience

The rebound resilience was measured in accordance with JIS K6255. A sample was prepared in the same manner as the sample used in the evaluation of compression set (CS) described above (2), and the measurement was performed under an atmosphere of 23° C.

Tear Strength

The tear strength was measured under an environment of 23° C. in accordance with ASTM D3574. A tear tester is used as the testing machine and the tear speed is set at 100 mm/min. The tear strength Tr (N/mm) was calculated by the following equation:

$$Tr = T0/T1 \times 9.81$$

T0: Tear stress (kg)
T1: Sample width (mm).

Compression Set (CS)

The compression set (CS) was measured in accordance with JIS K6262. The foamed product was cut out into a cylindrical shape having a diameter of 30 mm and a length of 15 mm or more, and then a sample having a thickness of 10 mm were obtained from each of the two parallel flat surfaces of the cylinder, with its skin layer remaining on one surface.

When the foamed product to be sampled is a three dimensional object having various shapes, the foamed product was also cut into a cylindrical shape having a diameter of 30 mm and a length of 15 mm or more, and then a sample having a thickness of 10 mm was obtained from each of the two parallel flat surfaces of the cylinder, with its skin layer remaining on one surface.

A dumbbell type cylindrical cutter can be used to cut the foamed product into a cylindrical shape and to cut off a sample from each of the surfaces of the parallel flat surfaces of the foamed product. The sample was compressed by 50%, left to stand in an environment of 50° C. for 6 hours, and the compression set was measured 30 minutes after the sample was released from the compression. The compression set (CS) was calculated by the following equation:

$$CS = (t0-t1)/(t0-t2) \times 100$$

t0: The original sample thickness (mm)
t1: The sample thickness 30 minutes after the sample was removed from the compression apparatus (mm)
t2: The spacer thickness (mm).

Example 1

Production of Ethylene-1-Octen Copolymer (A-1)

Copolymerization of ethylene and 1-octen was carried out continuously at a polymerization temperature of 165° C. and at a polymerization pressure of 2.8 MPaG, using a stainless steel polymerization vessel (stirring rotation speed=250 rpm) having an internal volume of 100 L and equipped with a stirring blade. The copolymerization reaction was carried out by continuously supplying dehydrated and purified hexane at 22 L/h, ethylene at 6.6 kg/h, 1-octene at 6.5 kg/h, hydrogen at 10 NL/h, bis(p-tolyl)methylene(cyclopentadienyl)(1,1,4,4,7,7,10,10-octamethyl-1,2,3,4,7,8,9,10-octahydrodibenzo(b,h)-fluorenyl)zirconium dichloride at 0.028 mmol/h, methylaluminoxane at 14 mmol/h in terms of aluminum, and triisobutylaluminum at 10 mmol/h, from the side of the polymerization vessel. A hexane solution of the resulting ethylene-1-octene copolymer was continuously discharged from a discharge port provided at the sidewall of the polymerization vessel, while adjusting the opening degree of a valve for controlling the liquid surface level such that the amount of the solution inside the polymerization vessel was maintained at 30 L. The hexane solution of the resulting ethylene/1-octen copolymer was introduced to a heater and heated to 180° C., and methanol as a catalyst deactivating agent was added at 80 mL/h to terminate the polymerization. The resultant was then continuously transferred to be subjected to a devolatilization step under reduced pressure, and dried to obtain an ethylene-1-octene copolymer (A-1).

The ethylene-1-octene copolymer (A-1) obtained as described above had a density d of 906 kg/m³ and an $MFR_{2.16}$ of 2.0 g/10 min, and was obtained at a yield of 7.0 kg/h. The physical properties thereof are shown in Table 1.

Production and Evaluation of Crosslinked Sheet

To 100 parts by mass of the ethylene-1-octene copolymer (A-1) obtained as described above, 0.8 part by mass of dicumyl peroxide (DCP) and 0.1 part by mass (as the TAIC content) of triallylisocyanurate (TAIC) (Trade name: M-60 (the content of TAIC: 60%), manufactured by Nippon Kasei Chemical Co., Ltd.) were melt blended using two rolls, to obtain a resin composition. Then a sheet having a thickness of 1 mm was prepared using a sheet molding machine, with the tip temperature controlled to 120° C., and the resulting sheet was heated in an oven controlled at 180° C. for 10 minutes to obtain a crosslinked sheet which was a crosslinked product.

The tensile strength, the gel content, and the surface condition of the resulting crosslinked sheet were evaluated. The results are shown in Table 1.

Production of Crosslinked Foamed Product

A mixture composed of 70 parts by mass of the ethylene-1-octene copolymer (A-1) obtained as described above, 30 parts by mass of ethylene vinyl acetate copolymer (VA content=22 wt %), 3.0 parts by mass of zinc oxide, 0.9 part by mass of dicumyl peroxide (DCP), 0.1 part by mass (as the TAIC content) of triallylisocyanurate (TAIC) (Trade name: M-60 (the content of TAIC: 60%), manufactured by Nippon Kasei Chemical Co., Ltd.), 5.5 parts by mass of azodicarbonamide, and 2 parts by mass of silicone rubber (Trade name: CF201U; manufactured by Dow Corning Corporation) was kneaded by a roll at a roll surface temperature of 120° C. for 10 minutes. The mixture was then formed into pellets using a single-screw extruder equipped with twin tapered screw at a temperature equal to or lower than the temperature at which the crosslinking and foaming of the mixture was not initiated (approximately at 130°).

The resulting pellets were charged into an injection foaming molding machine (manufactured by King Steel Corporation) to obtain a crosslinked foamed product. The mold conditions were 100 kg/cm², 170° C., and 7 minutes, and the injection foaming conditions (injection cylinder conditions) were set to an injection pressure of 90 kg/cm², a cylinder temperature of: C1/C2/C3/C4=80/85/90/95° C., and an injection rate of: C1/C2/C3/C4=28/26/24/22%. The size of the mold was 10 mm in thickness, 180 mm in length, and 60 mm in width.

The resulting crosslinked foamed product was subjected to annealing at 60° C. for 30 minutes immediately after the molding. The specific gravity, compression set, Asker C hardness and rebound resilience thereof were measured 24 hours later, according to the methods described above. The results are also shown in Table 1.

The MFR measurement of this crosslinked foamed product was carried out at a temperature of 190° C. and at a load of 2.16 kg, but the crosslinked foamed product had no fluidity. In other words, the crosslinked foamed product had an $MFR_{2.16}$ of less than 0.01 g/10 min.

Evaluation of Molding Stability

The injection molding was carried out 20 times in a row according to the above method, and the standard deviation of the length of the foamed molded article in the longitudinal direction was determined. The results are also shown in Table 1.

Example 2

Production of Ethylene-1-Butene Copolymer (A-2)

An ethylene-1-butene copolymer (A-2) was obtained in the same manner as in Example 1 except that the polymerization temperature was changed to 160° C., the polymerization pressure was changed to 3.2 MPaG, the feed rate of ethylene was changed to 7.5 kg/h, and 1-butene was supplied instead of 1-octene at 4.9 kg/h.

The ethylene-1-butene copolymer (A-2) obtained as described above had a density d of 895 kg/m³ and an $MFR_{2.16}$ of 3.0 g/10 min, and was obtained at a yield of 8.0 kg/h. The physical properties thereof are shown in Table 1.

Production of Crosslinked Foamed Product, and Evaluation of Physical Properties and Molding Stability Thereof The production of a crosslinked foamed product and the evaluation of the physical properties and molding stability thereof were carried out in the same manner as in Example 1 except that the ethylene-1-butene copolymer (A-2) obtained as described above was used instead of the ethylene-1-octene copolymer (A-1), and the components were mixed according to the formulation shown in Table 1. The results are also shown in Table 1.

Example 3

Production of Ethylene-1-Butene Copolymer (A-3)

An ethylene-1-butene copolymer (A-3) was obtained in the same manner as in Example 2 except that the feed rate of ethylene was changed to 7.0 kg/h and the feed rate of 1-butene was changed to 5.9 kg/h.

The ethylene-1-butene copolymer (A-3) obtained as described above had a density d of 885 kg/m³ and an $MFR_{2.16}$ f 2.6 g/10 min, and was obtained at a yield of 8.0 kg/h. The physical properties thereof are shown in Table 1.

Production and Evaluation of Crosslinked Sheet

The production of a crosslinked sheet and the evaluation thereof were carried out in the same manner as in Example 1 except that the ethylene-1-butene copolymer (A-3) obtained as described above was used instead of the ethylene-1-octene copolymer (A-1), and the components were mixed according to the formulation shown in Table 1. Results are shown in Table 1.

Production of Crosslinked Foamed Product, and Evaluation of Physical Properties and Molding Stability Thereof The production of a crosslinked foamed product and the evaluation of the physical properties and molding stability thereof were carried out in the same manner as in Example 1, except that the ethylene-1-butene copolymer (A-3) obtained as described above was used instead of the ethylene-1-octene copolymer (A-1), and the components were mixed according to the formulation shown in Table 1. The results are also shown in Table 1.

Example 4

Production of Ethylene-1-Butene Copolymer (A-4)

An ethylene-1-butene copolymer (A-4) was obtained in the same manner as in Example 2 except that the polymerization pressure was changed to 2.5 MPaG, and the feed rate of ethylene was changed to 6.6 kg/h, 1-butene to 3.3 kg/h, hydrogen to 5 NL/h, bis(p-tolyl)methylene(cyclopentadienyl)(1,1,4,4,7,7,10,10-octamethyl-1,2,3,4,7,8,9,10-octahydrodibenzo(b,h)-fluorenyl)zirconium dichloride to 0.040 mmol/h, and methylaluminoxane to 20 mmol.

The ethylene-1-butene copolymer (A-4) obtained as described above had a density d of 876 kg/m³ and an $MFR_{2.16}$ of 3.9 g/10 min, and was obtained at a yield of 8.4 kg/h. The physical properties thereof are shown in Table 1.

Production of Crosslinked Foamed Product, and Evaluation of Physical Properties and Molding Stability Thereof The production of a crosslinked foamed product and the evaluation of the physical properties and molding stability thereof were carried out in the same manner as in Example 1, except that the ethylene-1-butene copolymer (A-4) obtained as described above was used instead of the ethylene-1-octene copolymer (A-1) and the components were mixed according to the formulation shown in Table 1. The results are also shown in Table 1.

Example 5

Production of Ethylene-1-Butene Copolymer (A-5)

An ethylene-1-butene copolymer (A-5) was obtained in the same manner as in Example 2 except that the feed rate of hydrogen was changed to 15 NL/h.

The ethylene-1-butene copolymer (A-5) obtained as described above had a density d of 894 kg/m³ and an $MFR_{2.16}$ of 4.0 g/10 min, and was obtained at a yield of 8.1 kg/h. The physical properties thereof are shown in Table 1.

Comparative Example 1

Production of Ethylene-1-Octene Copolymer (A-6)

An ethylene/1-octene copolymer (A-6) was obtained in the same manner as in Example 1 except that the polymerization temperature was changed to 110° C., the polymerization pressure was changed to 0.8 MPaG, and the feed rate per hour of hexane was changed to 55 L/h, ethylene to 1.7 kg/h, and 1-octene to 2.1 kg/h; [dimethyl(t-butylamide) (tetramethyl-η5-cyclopentadienyl) silane]titaniumdichloride was supplied instead of bis(p-tolyl)methylene(cyclopentadienyl)(1,1,4,4,7,7,10,10-octamethyl-1,2,3,4,7,8,9,10-octahydrodibenzo(b,h)-fluorenyl)zirconium dichloride at a feed rate per hour of 0.009 mmol/h, triphenylcarbenium (tetrakispentafluorophenyl)borate was supplied instead of methylaluminoxane at 0.090 mmol/h, and the feed rate of triisobutylaluminum was changed to 6 mmol/h.

The ethylene/1-octene copolymer (A-6) obtained as described above had a density d of 905 kg/m³ and an $MFR_{2.16}$ of 1.2 g/10 min and was obtained at a yield of 1.3 kg/h. The physical properties thereof are shown in Table 1.

Production and Evaluation of Crosslinked Sheet

The production of a crosslinked sheet and the evaluation thereof were carried out in the same manner as in Example 1 except that the ethylene-1-butene copolymer (A-6) obtained as described above was used instead of the ethylene-1-octene copolymer (A-1), and the components were mixed according to the formulation shown in Table 1. Results are shown in Table 1.
Production of Crosslinked Foamed Product, and Evaluation of Physical Properties and Molding Stability Thereof The production of a crosslinked foamed product and the evaluation of the physical properties and molding stability thereof were carried out in the same manner as in Example 1, except that the ethylene-1-octene copolymer (A-6) obtained as described above was used instead of the ethylene-1-octene copolymer (A-1), and the components were mixed according to the formulation shown in Table 1. The results are also shown in Table 1.

Comparative Example 2

Production of Ethylene-1-Butene Copolymer (A-7)

Copolymerization of ethylene and 1-butene was carried out continuously at a polymerization temperature of 130° C., using a stainless steel polymerization vessel (stirring rotation speed=500 rpm) having a substantial internal volume of 1 L and equipped with a stirring blade, in a completely filled state. The copolymerization reaction was carried out by continuously supplying hexane at 1.82 L/h, ethylene at 56 g/h, 1-butene at 40 g/h, hydrogen at 0.6 NL/h, bis(p-tolyl) methylene(cyclopentadienyl)(1,1,4,4,7,7,10,10-octamethyl-1,2,3,4,7,8,9,10-octahydrodibenzo(b,h)-fluorenyl)zirconium dichloride at 0.0001 mmol/h, methylaluminoxane/toluene solution at 0.05 mmol/h in terms of aluminium, and triisobutylaluminum at 1.0 mmol/h, from the side of the polymerization vessel to the liquid phase, so that the polymerization pressure was maintained at 3.8 MPaG. A hexane solution of the continuously obtained ethylene-1-butene copolymer was stored in a holding drum, and methanol as a catalyst deactivating agent was added to the solution at 0.2 ml/h to terminate the polymerization.

The hexane solution of the resulting ethylene-1-butene copolymer was taken out every one hour, and the polymer was precipitated from the polymerization solution in 2 L of methanol, and the precipitate was dried at 130° C. for 10 hours under vacuum to obtain an ethylene/1-butene copolymer (A-7).

The ethylene-1-butene copolymer (A-7) obtained as described above had a density d of 907 kg/m$^3$ and an MFR$_{2.16}$ of 1.2 g/10 min, and was obtained at a yield of 43.5 g/h. The physical properties thereof are shown in Table 1.
Production and Evaluation of Crosslinked Sheet The production of a crosslinked sheet and the evaluation thereof were carried out in the same manner as in Example 1 except that the ethylene-1-butene copolymer (A-7) obtained as described above was used instead of the ethylene-1-octene copolymer (A-1), and the components were mixed according to the formulation shown in Table 1. Results are shown in Table 1.
Production of Crosslinked Foamed Product, and Evaluation of Physical Properties and Molding Stability Thereof The production of a crosslinked foamed product and the evaluation of the physical properties and molding stability thereof were carried out in the same manner as in Example 1, except that the ethylene-1-butene copolymer (A-7) obtained above was used instead of the ethylene-1-octene copolymer (A-1), and the components were mixed according to the formulation shown in Table 1. The results are also shown in Table 1.

Comparative Example 3

Production of Ethylene-1-Butene Copolymer (A-8)

Copolymerization of ethylene and 1-butene was carried out continuously at a polymerization temperature of 125° C., using a stainless steel polymerization vessel (stirring rotation speed=500 rpm) having a substantial internal volume of 1 L and equipped with a stirring blade, in a completely filled state. The copolymerization reaction was carried out by continuously supplying hexane at 1.73 L/h, ethylene at 56 g/h, 1-butene at 90 g/h, hydrogen at 0.5 NL/h, bis(p-tolyl) methylene(cyclopentadienyl)(1,1,4,4,7,7,10,10-octamethyl-1,2,3,4,7,8,9,10-octahydrodibenzo(b,h)-fluorenyl)zirconium dichloride at 0.00015 mmol/h, methylaluminoxane/toluene solution at 0.075 mmol/h in terms of aluminium, and triisobutylaluminum at 1.0 mmol/h, from the side of the polymerization vessel to the liquid phase, so that the polymerization pressure was maintained at 3.8 MPaG. A hexane solution of the continuously obtained ethylene-1-butene copolymer was stored in a holding drum, and methanol as a catalyst deactivating agent was added to the solution at 0.2 ml/h to terminate the polymerization.

The hexane solution of the resulting ethylene-1-butene copolymer was taken out every one hour, and the polymer was precipitated from the polymerization solution in 2 L of methanol, and the precipitate was dried at 130° C. for 10 hours under vacuum to obtain an ethylene-1-butene copolymer (A-8).

The ethylene/1-butene copolymer (A-8) obtained as described above had a density d of 884 kg/m$^3$ and an MFR$_{2.16}$ of 3.7 g/10 min, and was obtained at a yield of 49.0 g/h. The physical properties thereof are shown in Table 1.
Production and Evaluation of Crosslinked Sheet The production of a crosslinked sheet and the evaluation thereof were carried out in the same manner as in Example 1 except that the ethylene-1-butene copolymer (A-8) obtained as described above was used instead of the ethylene-1-octene copolymer (A-1), and the components were mixed according to the formulation shown in Table 1. Results are shown in Table 1. [0192]
Production of Crosslinked Foamed Product, and Evaluation of Physical Properties and Molding Stability Thereof The production of a crosslinked foamed product and the evaluation of the physical properties and molding stability thereof were carried out in the same manner as in Example 1, except that the ethylene-1-butene copolymer (A-8) obtained above was used instead of the ethylene-1-octene copolymer (A-1), and the components were mixed according to the formulation shown in Table 1. The results are also shown in Table 1.

Comparative Example 4

Method for Producing Ethylene-1-Octene Copolymer (A-9)

An ethylene-1-octene copolymer (A-9) was obtained in the same manner as in Comparative Example 3 except that the polymerization temperature was changed to 150° C., the feed rate per hour of hexane was changed to 1.40 L/h, the feed rate of ethylene was changed to 94 g/h, 1-octene was supplied instead of 1-butene at 286 g/h, hydrogen was not supplied, the feed rate of bis(p-tolyl)methylene(cyclopentadienyl)(1,1,4,4,7,7,10,10-octamethyl-1,2,3,4,7,8,9,10-octahydrodibenzo(b,h)-fluorenyl)zirconium dichloride was changed to 0.003 mmol/h, and the feed rate of methylaluminoxane/toluene solution was changed to 0.15 mmol/h in terms of aluminium. The resulting ethylene-1-octene copolymer (A-9) had a density d of 874 kg/m$^3$ and an MFR$_{2.16}$ of 1.1 g/10 min, and was obtained at a yield of 75.0 g/h. The physical properties thereof are shown in Table 1.

Production of Crosslinked Foamed Product, and Evaluation of Physical Properties and Molding Stability Thereof The production of a crosslinked foamed product and the evaluation of the physical properties and molding stability thereof were carried out in the same manner as in Example 1, except that the ethylene-1-butene copolymer (A-9) obtained as described above was used instead of the ethylene-1-octene copolymer (A-1), and the components were mixed according to the formulation shown in Table 1. The results are also shown in Table 1.

Comparative Example 5

Method for Producing Ethylene-1-Butene Copolymer (A-10)

An ethylene-1-butene copolymer (A-10) was obtained in the same manner as in Example 2 except that the polymerization temperature was changed to 130° C., the polymerization pressure was changed to 1.0 MPaG, the feed rate per hour of hexane was changed to 55 L/h, ethylene to 1.7 kg/h, 1-butene to 1.1 kg/h, and hydrogen to 20 NL/h; rac-dimethylsilylene-bis{1-(2-methyl-4-phenyl-1-indenyl)}zirconium dichloride was supplied instead of bis(p-tolyl)methylene (cyclopentadienyl)(1,1,4,4,7,7,10,10-octamethyl-1,2,3,4,7,8,9,10-octahydrodibenzo(b,h)-fluorenyl)zirconium dichloride at a feed rate of 0.0030 mmol/h, and the feed rate of methylaluminoxane was changed to 1.5 mmol/h in terms of aluminium, and triisobutylaluminum to 30 mmol/h.

The ethylene-1-butene copolymer (A-10) obtained as described above had a density d of 904 kg/m$^3$ and an MFR$_{2.16}$ of 1.1 g/10 min, and was obtained at a yield of 1.4 kg/h. The physical properties thereof are shown in Table 1.

Production and Evaluation of Crosslinked Sheet

The production and the evaluation of a crosslinked sheet were carried out in the same manner as in Example 1 except that the ethylene-1-butene copolymer (A-10) obtained above was used instead of the ethylene-1-octene copolymer (A-1), and the components were mixed according to the formulation shown in Table 1. The results are shown in Table 1.

Production of Crosslinked Foamed Product, and Evaluation of Physical Properties and Molding Stability Thereof The production of a crosslinked foamed product and the evaluation of the physical properties and molding stability thereof were carried out in the same manner as in Example 1, except that the ethylene-1-butene copolymer (A-10) obtained as described above was used instead of the ethylene-1-octene copolymer (A-1), and the components were mixed according to the formulation shown in Table 1. The results are also shown in Table 1.

TABLE 1

| | | Example 1 | Example 2 | Example 3 | Example 4 | Example 5 |
|---|---|---|---|---|---|---|
| Compositions and Physical properties of copolymer | Copolymer | A-1 | A-2 | A-3 | A-4 | A-5 |
| | Monomer species used in the copolymerization | Octene | Butene | Butene | Butene | Butene |
| | Polymerization temperature (° C.) | 165 | 160 | 160 | 160 | 160 |
| | Density d (kg/m$^3$) | 906 | 895 | 885 | 876 | 894 |
| | Ethylene content (mol %) | 95 | 91.5 | 88.6 | 86.3 | 91.2 |
| | MFR$_{2.16}$ | 2.0 | 3.0 | 2.6 | 3.9 | 4.0 |
| | MFR$_{10}$/MFR$_{2.16}$ | 8.9 | 8.8 | 9.0 | 8.6 | 9.5 |
| | Mw/Mn | 2.2 | 2.2 | 2.1 | 2.2 | 2.1 |
| | Vinyl group content (number of vinyl groups/1,000 carbon atoms) | 0.11 | 0.07 | 0.08 | 0.09 | 0.11 |
| | Vinylidene group content (number of vinylidene groups/1,000 carbon atoms) | 0.11 | 0.12 | 0.19 | 0.22 | 0.24 |
| | Total amount of unsaturated bonds | 0.93 | 0.65 | 0.93 | 1.1 | 1.09 |
| Crosslinked formed product | Formulation (Part(s) by weight based on 100 parts by weight of the resin components) | | | | | |
| | DCP | 0.9 | 0.9 | 0.9 | 0.9 | — |
| | TAIC | 0.1 | 0.1 | 0.1 | 0.1 | — |
| | Azodicarbonamide | 5.5 | 5.0 | 4.8 | 4.5 | — |
| | ZnO | 3.0 | 3.0 | 3.0 | 3.0 | — |
| | Silicone rubber | 2.0 | 2.0 | 2.0 | 2.0 | — |
| | Physical properties of crosslinked foamed product (Injection molded article) | | | | | |
| | Specific Gravity | 0.12 | 0.15 | 0.15 | 0.15 | — |
| | Asker C hardness | 56 | 55 | 48 | 40 | — |
| | Rebound resilience | 43 | 47 | 61 | 70 | — |
| | Tear strength (M/mm) | 2.5 | 3.1 | 2.7 | 2.2 | — |
| | Compression set (CS) (%) | 49 | 47 | 59 | 76 | — |
| | Molding stability (standard deviation of the size of the molded article when N = 20) | 2.1 | 2.2 | 2.3 | 2.4 | — |
| Crosslinked sheet | Copolymer used | A-1 | | A-3 | | |
| | Amount of DCP (phr) | 0.8 | | 0.8 | | |
| | Physical properties — Tensile strength (MPa) | 36 | | 32 | | |
| | Elongation (%) | 610 | | 700 | | |
| | Gel content (%) | 75 | | 75 | | |
| | Surface condition | Good | | Good | | |

TABLE 1-continued

|  |  | Comparative Example 1 | Comparative Example 2 | Comparative Example 3 | Comparative Example 4 | Comparative Example 5 |
|---|---|---|---|---|---|---|
| Compositions and Physical properties of copolymer | Copolymer | A-6 | A-7 | A-8 | A-9 | A-10 |
|  | Monomer species used in the copolymerization | Octene | Butene | Butene | Octene | Butene |
|  | Polymerization temperature (° C.) | 110 | 130 | 125 | 150 | 130 |
|  | Density d (kg/m$^3$) | 905 | 907 | 884 | 874 | 904 |
|  | Ethylene content (mol %) | 94.5 | 95.2 | 88.6 | 86 | 94.3 |
|  | MFR$_{2.16}$ | 1.2 | 1.2 | 3.7 | 1.1 | 1.1 |
|  | MFR$_{10}$/MFR$_{2.16}$ | 6.5 | 7.0 | 6.5 | 7.5 | 11.5 |
|  | Mw/Mn | 2.1 | 2.1 | 2.0 | 2.1 | 2.2 |
|  | Vinyl group content (number of vinyl groups/1,000 carbon atoms) | 0.02 | 0.05 | 0.05 | 0.08 | 0.04 |
|  | Vinylidene group content (number of vinylidene groups/1,000 carbon atoms) | 0.00 | 0.04 | 0.08 | 0.12 | 0.05 |
|  | Total amount of unsaturated bonds | 0.06 | 0.22 | 0.32 | 0.42 | 0.2 |
| Crosslinked formed product | Formulation (Part(s) by weight based on 100 parts by weight of the resin components) | | | | | |
|  | DCP | 0.9 | 0.9 | 0.9 | 0.9 | 0.9 |
|  | TAIC | 0.1 | 0.1 | 0.1 | 0.1 | 0.1 |
|  | Azodicarbonamide | 5.2 | 5.3 | 4.4 | 4.2 | 5.0 |
|  | ZnO | 3.0 | 3.0 | 3.0 | 3.0 | 3.0 |
|  | Silicone rubber | 2.0 | 2.0 | 2.0 | 2.0 | 2.0 |
|  | Physical properties of crosslinked foamed product (Injection molded article) | | | | | |
|  | Specific Gravity | 0.12 | 0.12 | 0.15 | 0.15 | 0.12 |
|  | Asker C hardness | 54 | 56 | 47 | 40 | 54 |
|  | Rebound resilience | 43 | 43 | 62 | 69 | 43 |
|  | Tear strength (M/mm) | 2.1 | 2.3 | 2.7 | 2.2 | 1.8 |
|  | Compression set (CS) (%) | 58 | 49 | 62 | 73 | 58 |
|  | Molding stability (standard deviation of the size of the molded article when N = 20) | 4.5 | 4.2 | 4 | 4.3 | 3.8 |
| Crosslinked sheet | Copolymer used | A-6 | A-7 | A-8 |  | A-10 |
|  | Amount of DCP (phr) | 1.2 | 1.2 | 1.2 |  | 1.2 |
|  | Physical properties — Tensile strength (MPa) | 35 | 34 | 30 |  | 33 |
|  | Elongation (%) | 570 | 570 | 650 |  | 560 |
|  | Gel content (%) | 74 | 74 | 74 |  | 75 |
|  | Surface condition | Poor | Poor | Poor |  | Good |

Evaluation Result of Crosslinked Sheet

It can be seen that the crosslinked products obtained in Examples 1 and 3, in which the ethylene α-olefin copolymer of the present invention is used, have a better strength and elongation as well as a better balance between the two, compared with that obtained in Comparative Example 5, in which a polymer having a value of the ratio MFR$_{10}$/MFR$_{2.16}$ larger than the range according to the present invention is used, although it is shown that the crosslinked products obtained in Examples 1 and 3, and that obtained in Comparative Example 5 have the same degree of crosslinking due to their gel content being the same. Further, it can be seen that the crosslinked products obtained in Examples 1 and 3 have a better surface condition and a better balance between the strength and elongation, compared with those obtained in Comparative Examples 1, 2 and 3, in which a polymer having a value of the ratio MFR$_{10}$/MFR$_{2.16}$ smaller than the range according to the present invention is used.

Evaluation Result of Crosslinked Foamed Product and Evaluation Result of Molding Stability.

It can been seen that the molded articles obtained in Examples 1 to 4, in which the ethylene α-olefin copolymer of the present invention is used, have better molding stability compared with those obtained in Comparative Examples 1 to 5, in which a polymer having a value of the ratio MFR$_{10}$/MFR$_{2.16}$ larger or smaller than the range according to the present invention is used. Further, the molded articles obtained in Examples 1 to 4 tend to have an excellent tear strength and small compression set.

INDUSTRIAL APPLICABILITY

The crosslinked product and the crosslinked foamed product according to the present invention can be used in conventionally known applications of crosslinked products and crosslinked foamed products without any restriction. Examples of the application include interior and exterior automotive parts such as interior surface materials for automobiles, weather strip sponges, body panels, steering wheels, and side shields; civil and building materials such as sheets for soil improvement, water sealing plates, and noise abatement walls; industrial parts; footwear parts such as soles and sandals; electric and electronic parts such as wire coverings, connectors, and cap plugs; sports and leisure goods such as golf club grips, baseball bat grips, swimming fins, and swimming goggles; and miscellaneous goods such as gaskets, waterproof clothes, garden hoses, belts, drainer sheets, and powder puffs. In particular, the crosslinked product and the crosslinked foamed product of the invention can be suitably used for footwear parts such as shoe soles, midsoles, inner soles, soles and sandals.

The invention claimed is:
1. A method for producing a crosslinked product, comprising the steps of:
   melt molding an ethylene copolymer (A) or a resin composition containing the ethylene copolymer (A); and
   carrying out crosslinking;
   wherein the ethylene copolymer (A) contains a constitutional unit derived from ethylene and a constitutional unit derived from an α-olefin having from 3 to 20 carbon atoms, and satisfies all of the following requirements (1), (2) and (3):
(1) a vinyl group content per 1,000 carbon atoms as measured by $^1$H-NMR is 0.09 or more and one or less;
(2) a ratio $MFR_{10}/MFR_{2.16}$ is 8.6 or more and 50 or less; and
(3) a density d is 850 kg/m$^3$ or more and 920 kg/m$^3$ or less
(wherein, $MFR_{10}$ represents a melt flow rate (g/10 min) as measured in accordance with ASTM D1238 at a load of 10 kg and at a temperature of 190° C.; and $MFR_{2.16}$ represents a melt flow rate (g/10 min) as measured in accordance with ASTM D1238 at a load of 2.16 kg and at a temperature of 190° C.).

2. The method for producing a crosslinked product according to claim 1, wherein the ethylene copolymer (A) further satisfies the following requirement (4):
(4) $MFR_{2.16}$ is within the range of from 0.01 to 200 g/10 min.

3. The method for producing a crosslinked product according to claim 1 or 2, wherein the ethylene copolymer (A) is an ethylene copolymer (A1) comprising ethylene-derived structural units and α-olefin-derived structural units alone as structural units.

4. The method for producing a crosslinked product according to claim 1, further comprising the step of carrying out foaming.

5. The method for producing a crosslinked product according to claim 1, wherein the step of melt molding is carried out by injection molding or transfer molding, and wherein the method further comprises the step of carrying out foaming.

6. A laminated molded article comprising a layer composed of one or more kinds of raw materials selected from the group consisting of polyolefin, polyurethane, rubber, leather and artificial leather, and the crosslinked product according to claim 1, wherein the layer composed of one or more kinds of raw materials and the crosslinked product are laminated together.

7. The laminated molded article according to claim 6, wherein the laminated molded article is a footwear part.

8. The laminated molded article according to claim 7, wherein the footwear part is a midsole, an inner sole, or a sole.

9. An ethylene copolymer (A) which contains a constitutional unit derived from ethylene and a constitutional unit derived from an α-olefin having from 3 to 20 carbon atoms, and which satisfies all of the following requirements (1), (2) and (3):
(1) a vinyl group content per 1,000 carbon atoms as measured by $^1$H-NMR is 0.09 or more and one or less;
(2) a ratio $MFR_{10}/MFR_{2.16}$ is 8.6 or more and 50 or less; and
(3) a density d is 850 kg/m$^3$ or more and 920 kg/m$^3$ or less
(wherein, $MFR_{10}$ represents a melt flow rate (g/10 min) as measured in accordance with ASTM D1238 at a load of 10 kg and at a temperature of 190° C.; and $MFR_{2.16}$ represents a melt flow rate (g/10 min) as measured in accordance with ASTM D1238 at a load of 2.16 kg and at a temperature of 190° C.).

10. The ethylene copolymer (A) according to claim 9, wherein the ethylene copolymer (A) further satisfies the following requirement (4):
(4) $MFR_{2.16}$ is within the range of from 0.01 to 200 g/10 min.

11. The ethylene copolymer (A) according to claim 9 or 10, wherein the ethylene copolymer (A) is an ethylene copolymer (A1) comprising ethylene-derived structural units and α-olefin-derived structural units alone as structural units.

12. An ethylene copolymer composition comprising the ethylene copolymer (A) according to claim 9 and a crosslinking agent (C).

13. The ethylene copolymer composition according to claim 12, further comprising a foaming agent (D).

* * * * *